(12) United States Patent
Kitagawa

(10) Patent No.: US 7,936,405 B2
(45) Date of Patent: May 3, 2011

(54) LIQUID CRYSTAL DISPLAY DEVICE AND DRIVING METHOD FOR THE SAME

(75) Inventor: Yoshiro Kitagawa, Kawasaki (JP)

(73) Assignee: NEC LCD Technologies, Ltd, Kanagawa (JP)

( * ) Notice: Subject to any disclaimer, the term of this patent is extended or adjusted under 35 U.S.C. 154(b) by 238 days.

(21) Appl. No.: 12/259,909

(22) Filed: Oct. 28, 2008

(65) Prior Publication Data
US 2009/0109356 A1  Apr. 30, 2009

(30) Foreign Application Priority Data
Oct. 29, 2007  (JP) ................................ 2007-280674

(51) Int. Cl.
G02F 1/133 (2006.01)
(52) U.S. Cl. ......................................... 349/33
(58) Field of Classification Search .......... None
See application file for complete search history.

(56) References Cited

U.S. PATENT DOCUMENTS

| | | | |
|---|---|---|---|
| 2004/0227891 A1* | 11/2004 | Hirota | 349/141 |
| 2004/0263749 A1* | 12/2004 | Jeong et al. | 349/141 |
| 2008/0129901 A1* | 6/2008 | You et al. | 349/33 |
| 2008/0239225 A1* | 10/2008 | Chen et al. | 349/139 |

FOREIGN PATENT DOCUMENTS

JP  11-231344 A  8/1999

* cited by examiner

Primary Examiner — Sung H Pak
(74) Attorney, Agent, or Firm — Sughrue Mion, PLLC

(57) ABSTRACT

A liquid crystal display device of the present invention includes a TFT substrate having a substrate and a display pixel arranged in a matrix form on the substrate, a counter substrate opposed to the TFT substrate and being stuck therewith and a liquid crystal enclosed between the TFT substrate and the counter substrate, the pixel electrode and the first common electrode are arranged so that an electric field along a principal plane of the TFT substrate can be applied to the liquid crystal, a second common electrode for inputting a common electric potential is formed on the counter substrate, the second common electrode is opposed to the first common electrode, and a conduction part for electrically connecting the second common electrode and the first common electrode mutually and transmitting the common electric potential to the first common electrode is formed near each display pixel or near a predetermined display pixel.

9 Claims, 17 Drawing Sheets

LIQUID CRYSTAL DISPLAY DEVICE AND DRIVING METHOD FOR THE SAME

INCORPORATION BY REFERENCE

This application is based upon and claims the benefit of priority from Japanese Patent Application No. 2007-280674, filed on Oct. 29, 2007, the disclosure of which is incorporated herein in its entirety by reference.

BACKGROUND OF THE INVENTION

1. Technical Field

The present invention relates to a liquid crystal display (LCD) device and a driving method for the same and in particular, relates to an IPS (in-plane-switching) mode LCD device and the driving method for the same.

2. Background Art

In recent years, a liquid crystal display (LCD) device with a wide viewing angle has been developed. An IPS (in-plane-switching) mode is one of the methods for realizing a wide viewing angle of the LCD device. In the IPS mode LCD device, comb-shaped electrodes are formed only on a surface of one substrate of a pair of substrates which an LCD panel has, and a liquid crystal is driven by a transverse electric field parallel to the both substrates. In this IPS mode, when an electric field is applied to a liquid crystal, a liquid crystal molecule rotates in parallel with the substrate. Therefore, even when seen from every viewing angle, a refractive index change in the liquid crystal molecule hardly occurs and a desired image is obtained with a wide viewing angle. For this reason, this IPS mode is noted from a view of a super-wide viewing angle recently.

FIG. 23 is a plan view of a TFT substrate 1001 provided in a related IPS mode LCD device 1000 (FIG. 24), and FIG. 24 and FIG. 25 are cross sectional views of the LCD device 1000. FIG. 24 is a cross sectional view of a part corresponding to the line XXIV-XXIV in FIG. 23, and FIG. 25 is a cross sectional view of a part corresponding to the line XXV-XXV in FIG. 23. In FIG. 23, an alignment film 1012 and a second insulating film 1010 mentioned later are not illustrated.

As shown in FIG. 24 and FIG. 25, the LCD device 1000 is provided with a TFT substrate 1001 and a color filter substrate 1002 opposing the TFT substrate 1001. The color filter substrate 1002 is stuck on the TFT substrate 1001, and a liquid crystal layer 1003 is inserted therebetween.

The TFT substrate 1001 includes a flat glass substrate 1004 with a scanning line 1007 and a common electrode wiring 1015 formed thereon, a first insulating layer 1005 formed on the glass substrate 1004 so as to cover the scanning lines 1007 and the common electrode wiring 1015, a data line (signal line) 1008, a pixel electrode 1009 and a thin-film transistor (TFT) 1014 which are formed on the first insulating layer 1005, a second insulating layer 1010 formed on the first insulating layer 1005 so as to cover the data lines 1008 and the thin-film transistor 1014, a common electrode 1011 formed on the second insulating layer 1010, and an alignment film 1012 formed on the second insulating layer 1010 to cover the common electrode 1011.

The scanning line 1007 and the common electrode wiring 1015 extend in a row direction (an X direction of FIG. 23), respectively, and several these lines are formed with a predetermined interval. The data line 1008 extends in a column direction (a Y direction of FIG. 23) which intersects perpendicularly to the row direction, and several these lines are formed with a predetermined interval. The scanning line 1007, the data line 1008, and the common electrode wiring 1015 are composed of metallic films, for example.

The pixel electrode 1009 is composed of comb-shaped pixel electrode comb-teeth 1009A, and a storage capacitance formation part 1009B which forms a capacitance with the common electrode 1011. The storage capacitance formation part 1009B is located on the common electrode wiring 1015. As shown in FIG. 23, the pixel electrode comb-tooth 1009A is located in a display area 1013 which is inserted between the common electrode wiring 1015 and the scanning line 1007, and is inserted between the adjacent data lines 1008. The pixel electrode comb-teeth 1009A are electrically connectable with the data line 1008 via the thin-film transistor 1014.

The storage capacitance formation part 1009B extends in a row direction so that a part of the common electrode wiring 1015 is covered with it.

The common electrode 1011 includes a latticed part 1011A and common electrode comb-teeth 1011B. The latticed part 1011A has an approximately latticed shape pattern, which is arranged to cover the data line 1008 and the common electrode wiring 1015 and the display area 1013 is surrounded therewith. The common electrode comb-tooth 1011B has a shape of a comb-tooth, and is projected into the display area 1013 out of a part in the latticed part 1011A which covers the common electrode wiring. 1015.

On the other hand, the color filter substrate 1002 includes a flat glass substrate 1020, a black matrix layer 1021 formed on the glass substrate 1020, a color layer 1022 formed on the glass substrate 1020 so as to cover the black matrix layer 1021, and an alignment film 1024 formed on the color layer 1022. The black matrix layer 1021 is formed in a plane shape of an approximately latticed shape so as to oppose and cover the data line 1008, the scanning line 1007 and the common electrode wiring 1015 on the TFT substrate 1001. The black matrix layer 1021 has a light-shielding function.

Japanese Patent Application Laid-Open Hei 11-231344 discloses another type of an IPS mode LCD device in which a first common electrode and a pixel electrode are arranged on an array substrate so that a transverse electric field can be produced and a second common electrode opposing the first common electrode of the array substrate is formed on a counter substrate.

SUMMARY

An exemplary object of the present invention is to provide an LCD device in which an aperture ratio of a display area is improved, and spots, stains and an afterimage, etc. in an image display can be prevented.

An LCD device according to an exemplary aspect of the invention includes a TFT substrate having a substrate and a display pixel arranged in a matrix form on the substrate, with the display pixel including a plurality of scanning lines, a plurality of signal lines, a plurality of pixel electrodes, a plurality of thin film transistors and a first common electrode, a counter substrate opposed to the TFT substrate and being stuck therewith and a liquid crystal enclosed between the TFT substrate and the counter substrate, the pixel electrode and the first common electrode are arranged so that an electric field along a principal plane of the TFT substrate can be applied to the liquid crystal, a second common electrode for inputting a common electric potential is formed in the counter substrate, the second common electrode is opposed to the first common electrode, and a conduction part for electrically connecting the second common electrode and the first common electrode mutually and transmitting the common electric potential to the first common electrode is formed near each display pixel or near a predetermined display pixel.

BRIEF DESCRIPTION OF THE DRAWINGS

Exemplary features and advantages of the present invention will become apparent from the following detailed description when taken with the accompanying drawings in which.

EXEMPLARY EMBODIMENT

Exemplary embodiments of the present invention will now be described in detail in accordance with the accompanying drawings.

A First Exemplary Embodiment

Figure 1:
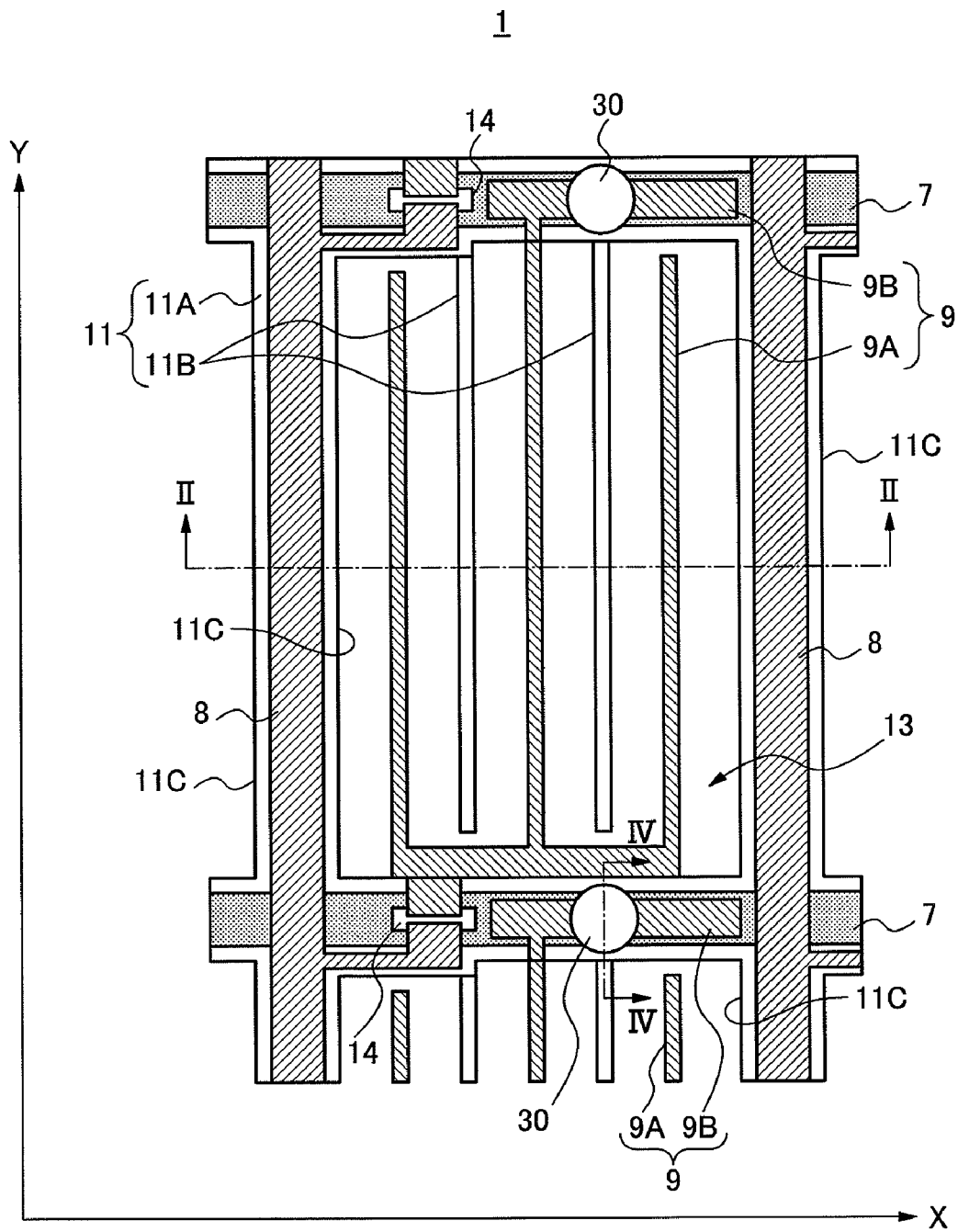
FIG. 1 is a plan view of a TFT substrate provided in an LCD device according to a first exemplary embodiment.
Figure 2:
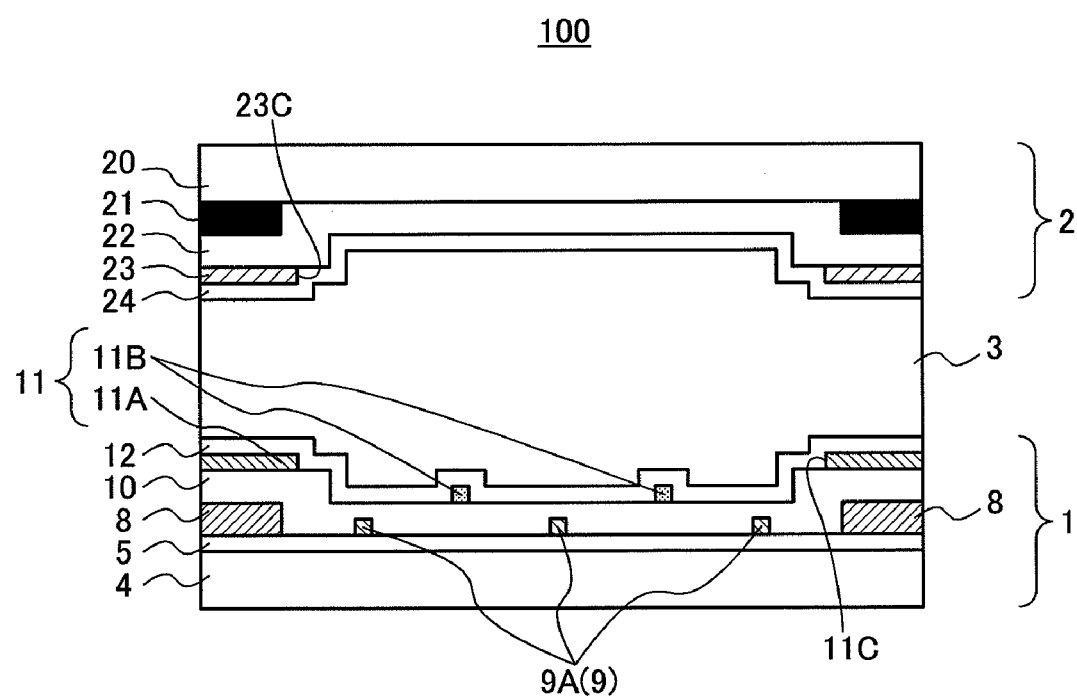
FIG. 2 is a cross-sectional view taken along the line II-II in FIG. 1.
Figure 4:
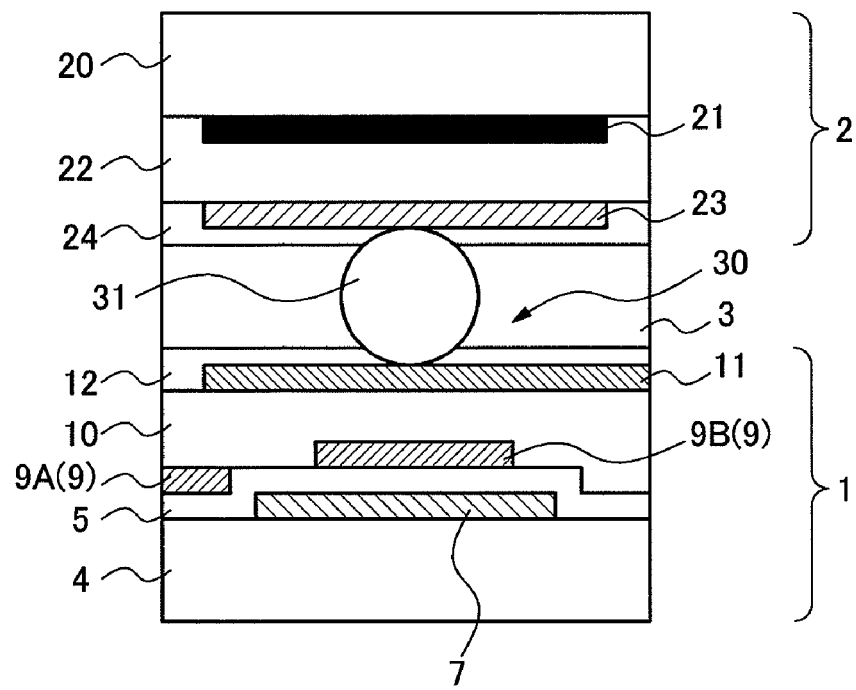
FIG. 4 is a cross-sectional view taken along the line IV-IV in FIG. 1.

FIG. 1 is a plan view of a TFT substrate 1 provided in an LCD device 100 (FIG. 2) according to a first exemplary embodiment, and FIG. 2 and FIG. 4 are cross sectional views of the LCD device 100 according to the first exemplary embodiment. Here, FIG. 2 is the cross sectional view of a part corresponding to the line II-II in FIG. 1, and FIG. 4 is the cross sectional view of a part corresponding to the line IV-IV in FIG. 1. An alignment film 12 and a second insulating film 10 mentioned later are not illustrated in FIG. 1.

Figure 3:
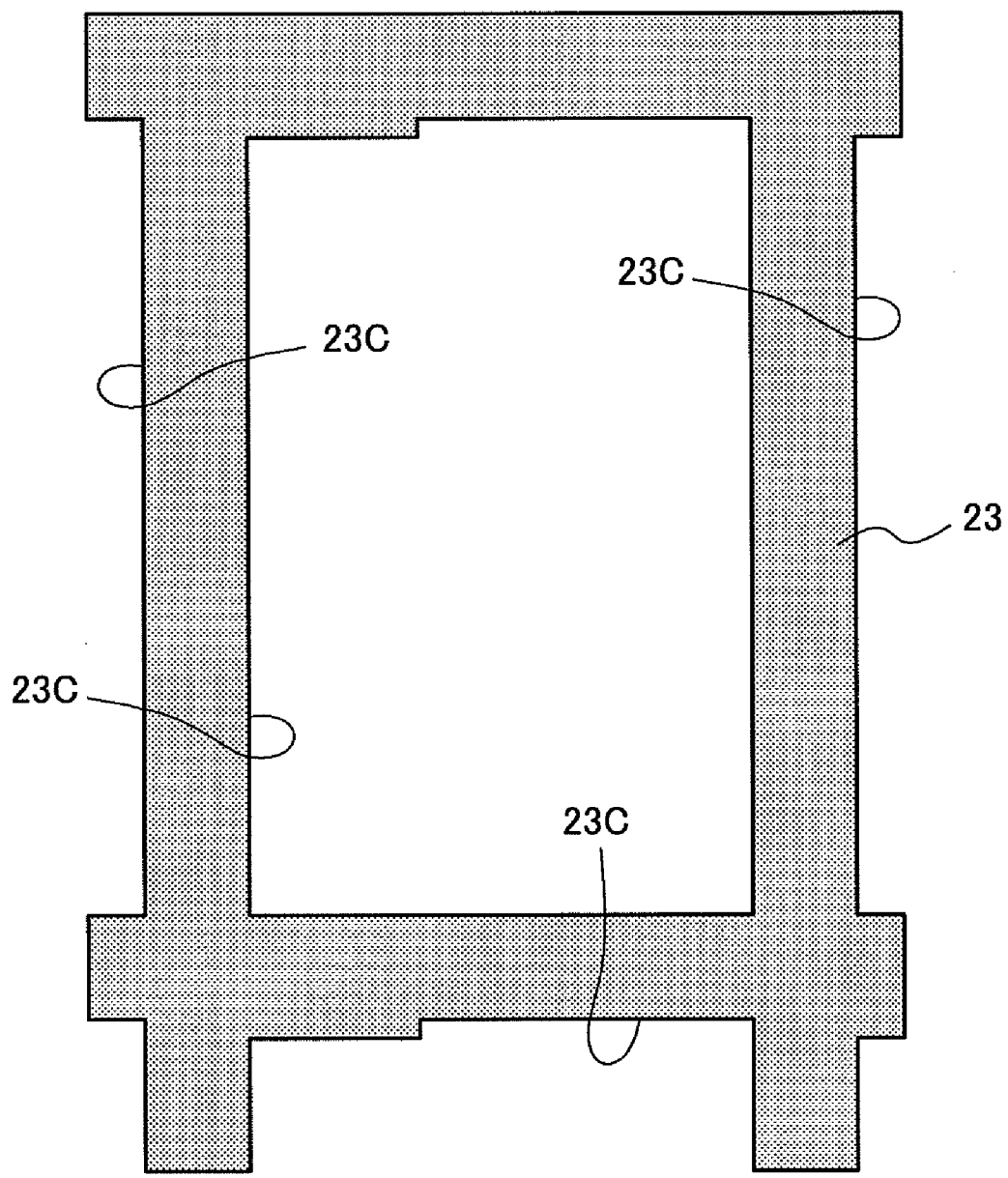
FIG. 3 is a plan view of a second common electrode provided in a counter substrate of the LCD device according to the first exemplary embodiment.
Figure 5:
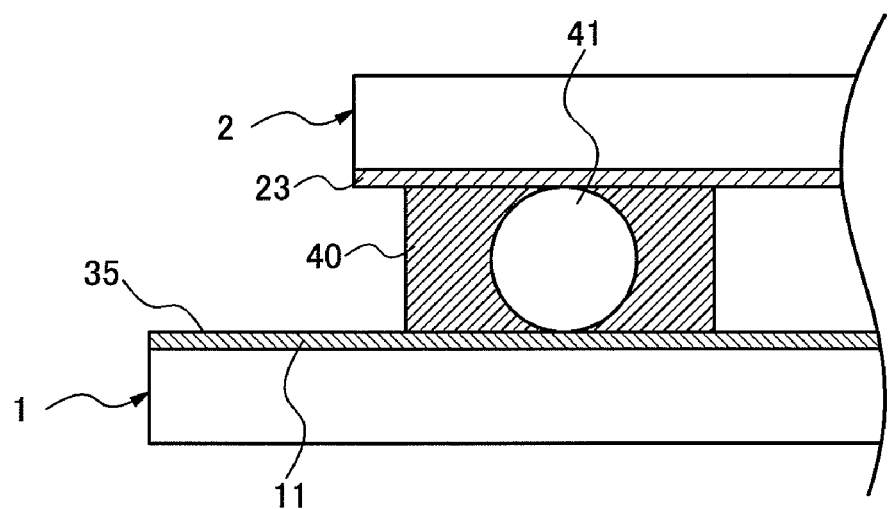
FIG. 5 is a cross-sectional view showing a structure of a peripheral edge part of the TFT substrate and the counter substrate of the LCD device according to the first exemplary embodiment.

FIG. 5 is a cross-sectional view showing a structure of a peripheral edge part of a TFT substrate 1 and a color filter substrate (counter substrate) 3 of the LCD device 100 according to the first exemplary embodiment. FIG. 3 is a plan view of a second common electrode 23 provided in the color filter substrate 2 of the LCD device 100.

The LCD device 100 is an LCD device called a transverse electric field mode or an IPS (in-plane-switching) mode. As shown in FIG. 2, the LCD device 100 includes a TFT substrate 1 and a color filter substrate 2 opposing the TFT substrate 1. The color filter substrate 2 is stuck on the TFT substrate 1, and a liquid crystal layer 3 is interposed therebetween.

The TFT substrate 1 includes a flat glass substrate 4 as an example with a preferable substrate, a scanning line 7 formed on the glass substrate 4, a first insulating film 5 formed on the glass substrate 4 so as to cover the scanning line 7, a data line (signal line) 8, a pixel electrode 9, and a switching element 14 (called a TFT hereafter), such as a thin-film transistor (TFT) which are formed on the first insulating film 5, a second insulating film 10 formed on the first insulating film 5 so as to cover these data line 8, pixel electrode 9, and TFT 14, a first common electrode 11 formed on the second insulating film 10 and an alignment film 12 formed on the second insulating film 10 so as to cover the first common electrode 11.

On the glass substrate 4, as shown in FIG. 1, more specifically, several scanning lines 7 extending respectively in a row direction (an X direction in FIG. 1), are formed with a predetermined interval. On the first insulating film 5, several data lines 8 extending respectively in a column direction (a Y direction in FIG. 1) which intersect perpendicularly to the row direction, are formed with a predetermined interval. Here, the scanning line 7 and the data line 8 are composed of metallic films, for example.

A display pixel demarcated by the scanning line 7 and the data line 8 constitutes the LCD device 100, and a plurality of display pixels are arranged in a matrix form in a row direction and a column direction. The respective display pixels have a pixel electrode 9, a first common electrode 11, a TFT 14, and a display area 13.

The pixel electrode 9 is composed of a comb-shaped pixel electrode comb-tooth (comb-tooth-shaped portion) 9A and a storage capacitance formation part 9B. As shown in FIG. 1, the pixel electrode comb-tooth 9A is located in an area surrounded by the adjacent scanning lines 7 and the adjacent data lines 8, i.e., in the display area 13. In FIG. 1, although the case where the pixel electrode comb-tooth 9A has three comb-tooth-shaped portions is shown, the number of the comb-tooth-shaped portion is not restricted to this, but can be changed suitably. The pixel electrode comb-tooth 9A is electrically connectable with the data line 8 via the TFT 14. That is, when the TFT 14 is set to ON, the pixel electrode comb-tooth 9A will electrically be connected with the data line 8 via the TFT 14, and pixel potential will be applied to the pixel electrode comb-tooth 9A via the TFT 14 from the data line 8.

The storage capacitance formation part 9B is located under a latticed part 11A (mentioned later) of the first common electrode 11 and extends in a row direction on the scanning line 7. That storage capacitance formation part 9B forms a capacitance with the first common electrodes 11.

As shown in FIG. 1 and FIG. 2, an opening 11C is formed in the first common electrode 11 in a position corresponding to each display area 13. That is, the opening 11C is formed in a row direction and a column direction in a matrix form. Here, the first common electrode 11 includes a latticed part 11A and a common electrode comb-tooth 11B of which the opening 11C is composed. This latticed part 11A is a pattern of an approximately latticed shape which covers the data line 8, the scanning line 7, and the TFT 14, and surrounds each display area 13. And the latticed part 11A supplies a common electric potential which is propagated through the second common electrode 23 formed in the color filter substrate 2 to the common electrode comb-tooth 11B formed in each display pixel. The latticed part 11A also further has a function to prevent electric field leakage from the data line 8 to the liquid crystal layer 3.

The common electrode comb-tooth 11B is a portion projected over a display area 13 in a shape of a comb-tooth from a part in the latticed part 11A which covers the scanning line 7, and is formed in every display area 13. Although the case where the first common electrode 11 is provided with two common electrode comb-teeth 11B in each display area 13 is shown in FIG. 1, the number of the common electrode comb-tooth 11B is not limited to this and is changed suitably.

The pixel electrode comb-tooth 9A and the common electrode comb-tooth 11B are arranged so that they may project into the display area 13, and an electric field is applied along a principal surface of the TFT substrate 1 to a liquid crystal material which constitutes the liquid crystal layer 3. Thus, a driving voltage can be reduced.

On the other hand, as shown in FIG. 2, the color filter substrate 2 includes a flat glass substrate 20, a black matrix layer 21 formed on the glass substrate 20, a color layer 22 formed on the glass substrate 20 so as to cover the black matrix layer 21, a second common electrode 23 formed on the color layer 22, and an alignment film 24 formed on the color layer 22 so as to cover the second common electrode 23.

The black matrix layer 21 with a light-shielding function is arranged so that it may be opposed to the data line 8, the scanning line 7 and the TFT 14 of the TFT substrate 1, and it is formed in a plane shape of an approximately latticed planar shape so as to cover them. Other light shielding layer with a light-shielding function may be formed instead of the black matrix layer 21.

The color layer 22 includes paint with a color corresponding to a display color (for example, any one color of red, blue, and green) which is set up every display area 13 in order to perform color display. An overcoat (not shown) which covers the color layer 22 may be further formed on the color layer 22.

The second common electrode 23 is the same shape as the latticed part 11A of which the first common electrode 11 is composed. As shown in FIG. 2 and FIG. 3, an opening 23C is formed in the second common electrode 23 in a position corresponding to each display area 13. That is, the second common electrode 23 has an opening 23C which is formed in a row direction and a column direction in a matrix form. And the second common electrode 23 is formed in a position which covers the black matrix layer 21 and is opposed to the latticed part 11A which constitutes the first common electrode 11. Here, the second common electrode 23, the first common electrode 11 and the pixel electrode 9 may be opaque films of metal and may be transparent films of indium tin oxide (ITO) or the like.

As shown in FIG. 1 and FIG. 4, the second common electrode 23 and the latticed part 11A of the first common electrode 11 are electrically connected, for example via a conductive spacer 31 in a conduction part 30 located in an outside of the display area 13. Preferably, the conductive spacer 31 is spherical or columnar, for example, but it may be other shape. The conductive spacer 31 is formed by coating a metal (gold etc.) on a resin, for example, and is arranged by means of an ink jet method or a printing method in a fixed position on the alignment film 24 or the alignment film 12. As long as the conduction between the second common electrode 23 and the first common electrode 11 is obtained, a position of the conduction part 30 will not be restricted to the position shown in FIG. 1.

In this exemplary embodiment, the conductive spacer 31 is arranged between the TFT substrate 1 and the color filter substrate 2 by pressurization which is applied to at the time when the TFT substrate 1 and the color filter substrate 2 are made oppose and stuck together. Therefore, as shown in FIG. 4, the conductive spacer 31 breaks through the alignment films 12 and 24, and can contact with the second common electrode 23 and the first common electrode 11, respectively. Accordingly, conduction between the second common electrode 23 and the first common electrode 11 is fully obtained. As shown in FIG. 1, the conduction parts 30 may be arranged near every display pixel. And the conduction part 30 may be arranged only near the predetermined display pixel, for example, one of conduction parts 30 may be arranged per predetermined number of display pixel.

As shown in FIG. 5, a terminal 35 for inputting common electric potential into the first common electrode 11 is formed in a peripheral edge part of the TFT substrate 1. The TFT substrate 1 and the color filter substrate 2 are mutually stuck with a sealing agent 40 in those peripheral edge parts. Here, in this exemplary embodiment, a conductive spacer (periphery conduction part) 41 is mixed in the sealing agent 40 in condition of a paste before adhering. And the first common electrode 11 and the second common electrode 23 are mutually connected electrically via the conductive spacer 41 when the TFT substrate 1 and the color filter substrate 2 are stuck together with the sealing agent 40. As a result, the common electric potential inputted into the first common electrode 11 from the terminal 35 is inputted also into the second common electrode 23 via the conductive spacer 41. The periphery conduction part is constituted by the conductive spacer 41.

In FIG. 5, illustration of the alignment films 12 and 24, the scanning line 7, the data line 8, and a terminal structure connecting to the common electrode 11 is omitted. Although illustration is omitted in FIG. 5, signal input terminals to the scanning line 7 and the data line 8 are also formed in the peripheral edge part of the TFT substrate 1.

Figure 23:
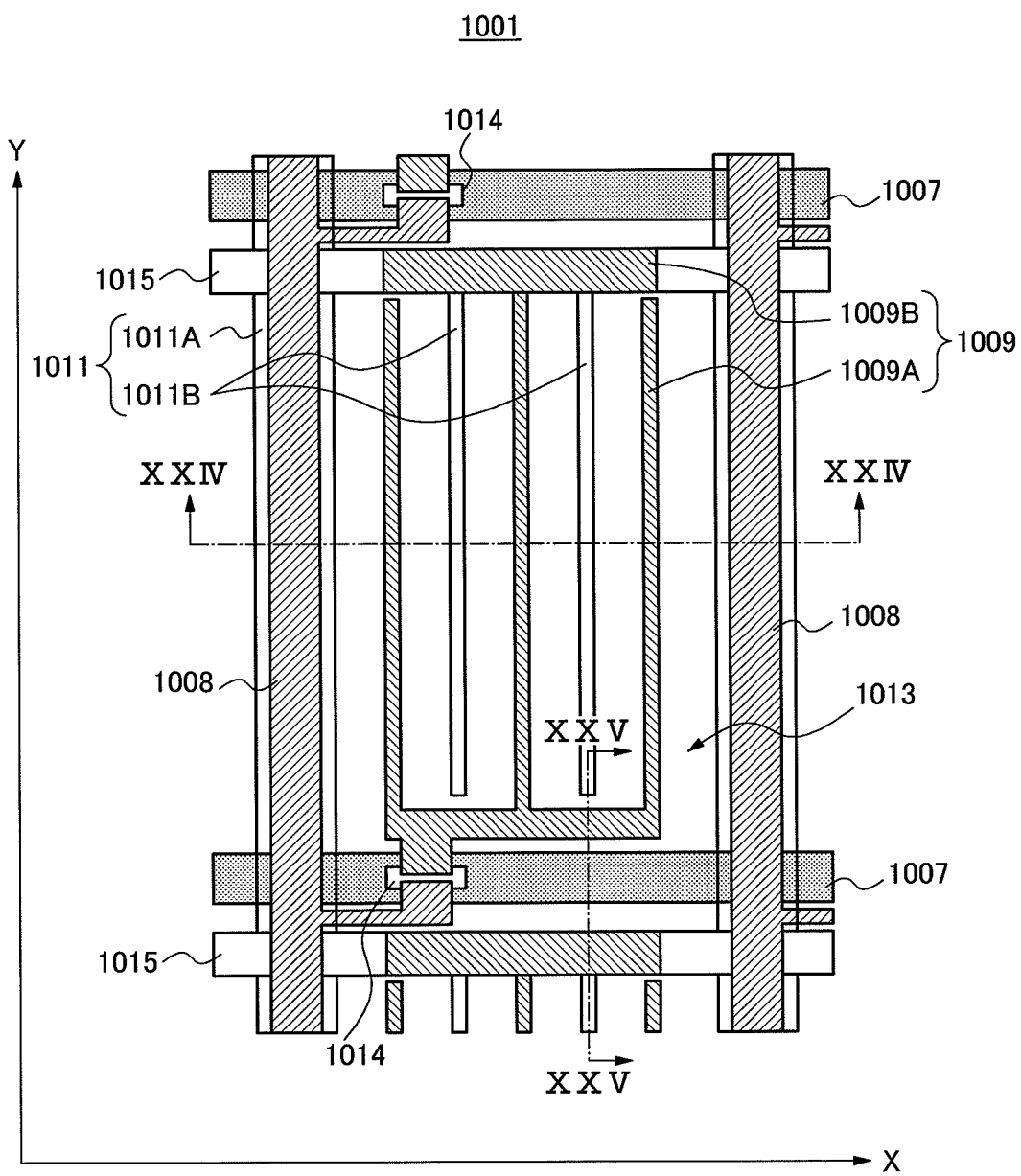
FIG. 23 is a plan view of a TFT substrate provided in a related LCD device of an IPS mode.
Figure 24:
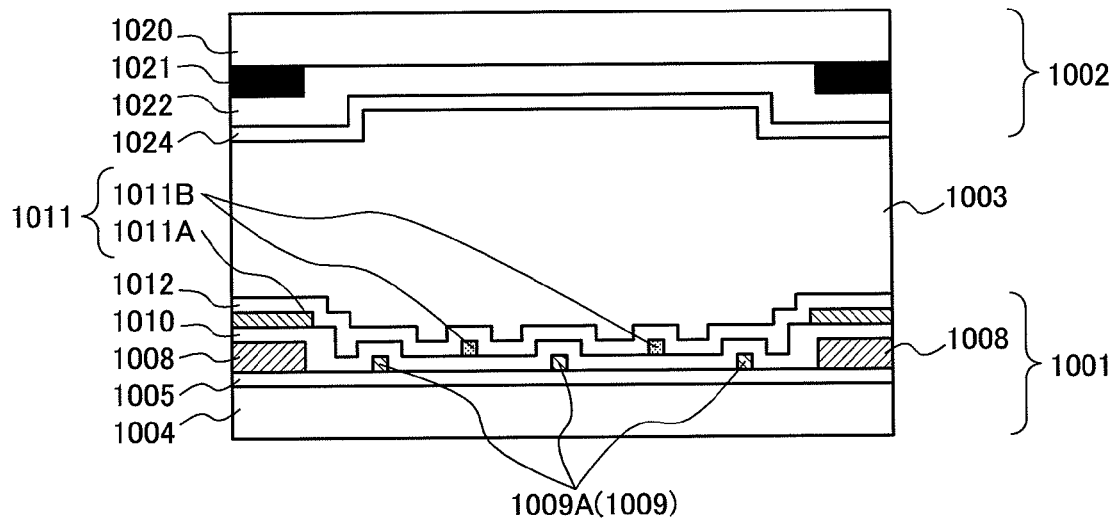
FIG. 24 is a cross sectional view taken along the line XXIV-XXIV in FIG. 23.
Figure 25:
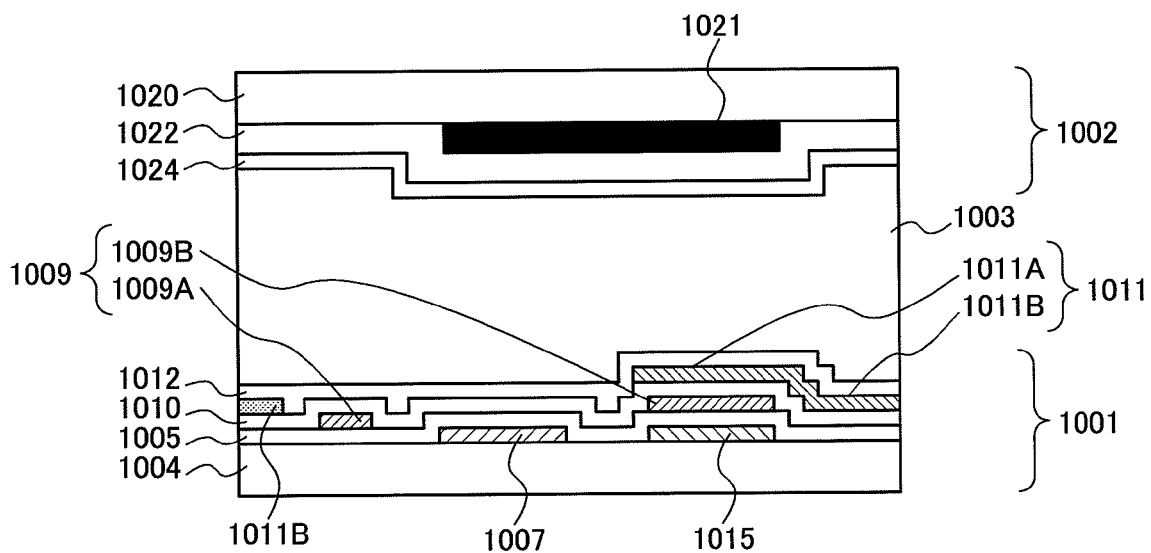
FIG. 25 is a cross sectional view taken along the line XXV-XXV in FIG. 23.

As shown in FIG. 1, in the LCD device 100 according to this exemplary embodiment, metallic wirings are formed on the TFT substrate 1 which are only the data line 8 extending in the column direction, and the scanning line 7 extending in the row direction. That is, the common electrode wiring 1015 with which the related LCD device shown in FIG. 23 is provided does not exist. This reason is because the second common electrode 23 is arranged in the color filter substrate 2 as opposed to the first common electrode 11 of the TFT substrate 1 in the LCD device 100 according to this exemplary embodiment instead of the common electrode wiring provided in the TFT substrate of the related LCD device.

Next, operation of the LCD device 100 according to this exemplary embodiment is described.

In the related LCD device, the common electric potential supplied to the common electrode of each display pixel is supplied from the common electrode wiring which is composed of a metallic film formed on the TFT substrate. In contrast, the common electrode wiring composed of a metallic film is not formed on the TFT substrate 1 in the LCD device 100 according to this exemplary embodiment. The second common electrode 23 is formed in the color filter substrate 2 instead of this. And the common electric potential is supplied to the first common electrode 11 of the TFT substrate 1 via the conductive spacer 31 from the second common electrode 23, and the LCD device 100 is driven by this.

According to this exemplary embodiment, input of the common potential to the first common electrode 11 provided in the TFT substrate 1 can be performed via the conducting part 30 from the second common electrode 23 provided in the color filter substrate 2. Therefore, the common electrode wiring provided in the TFT substrate of the related LCD device becomes unnecessary. As a result, because area of an opening for the display area 13 is increased by the area of this common electrode wiring, an aperture ratio increases and display performance improves.

The color layer 22 and the black matrix layer 21 which were formed in the color filter substrate 2 can be shielded from an electric field generated in the TFT substrate 1 by means of the second common electrode 23 formed in the color filter substrate 2. Therefore, generation of spots, stains and an afterimage in the LCD device can be suppressed.

Modification 1 of the First Exemplary Embodiment

Figure 6:
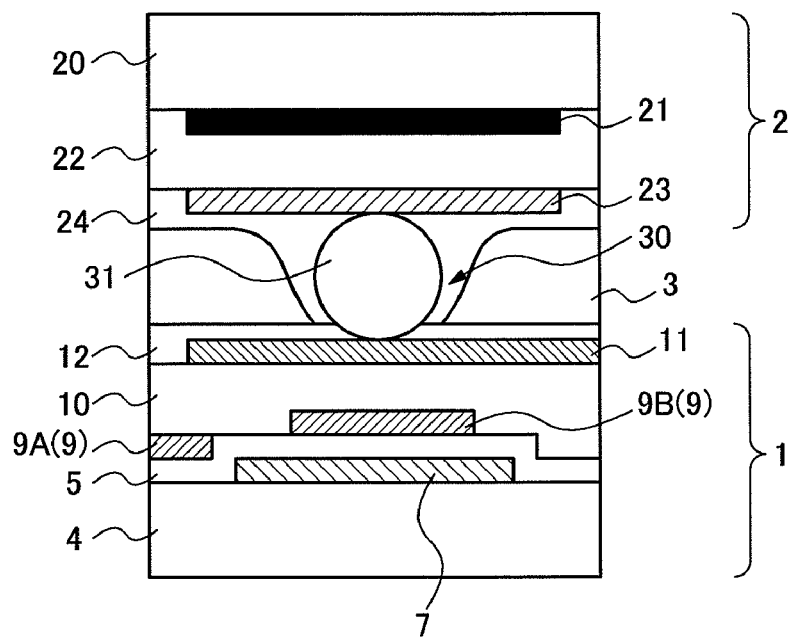
FIG. 6 is a cross-sectional view showing a structure of a conduction part in a case of a modification 1 of the first exemplary embodiment.

FIG. 6 is a cross-sectional view (cross-sectional view of a part corresponding to the line IV-IV in FIG. 1) showing a structure of a conduction part 30 in a modification 1 of the first exemplary embodiment.

In the first exemplary embodiment, the conductive spacer 31 is formed after forming the alignment film 24. On the other hand, in the modification 1, as shown in FIG. 6, the conductive spacer 31 is first arranged in a fixed position on the second common electrode 23, for example by means of an ink jet method or a printing method. The alignment film 24 is formed after that, and the TFT substrate 1 and the color filter substrate 2 are stuck together.

In the modification 1, when the TFT substrate 1 and the color filter substrate 2 are stuck by pressurization, the conductive spacer 31 breaks through the alignment film 12 and contacts with the first common electrode 11. Accordingly, conduction between the second common electrode 23 and the first common electrode 11 is fully obtained. Contrary to this, after arranging the conductive spacer 31 on the first common electrode 11, the alignment film 12 may be formed, and the TFT substrate 1 and the color filter substrate 2 may be stuck together.

Modification 2 of the First Exemplary Embodiment

Figure 7:
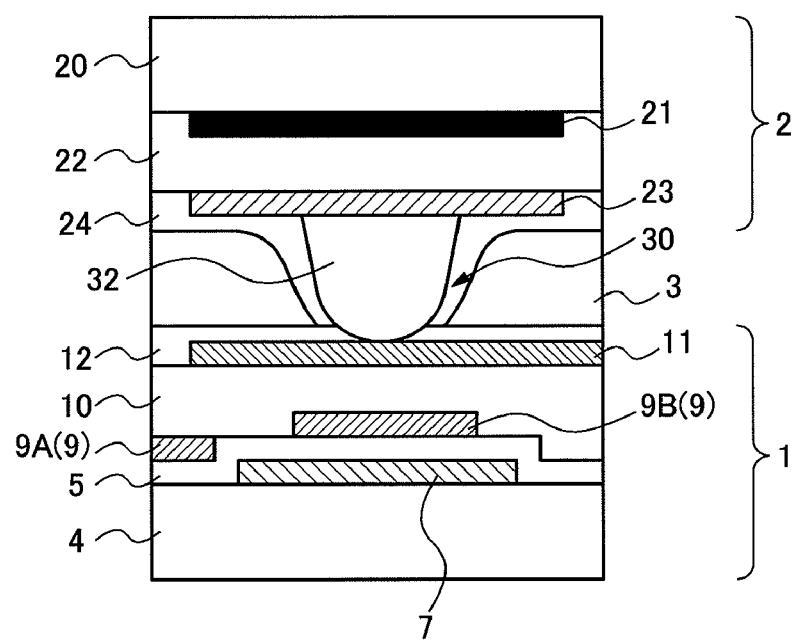
FIG. 7 is a cross-sectional view showing a structure of a conduction part in a case of a modification 2 of the first exemplary embodiment.

FIG. 7 is a cross sectional view (cross sectional view of a part corresponding to the line IV-IV in FIG. 1) showing a structure of a conducting part 30 in a modification 2 of the first exemplary embodiment.

The modification 2 differs from the modification 1 shown in FIG. 6 only in forming a conductive pillar 32 instead of the conductive spacer 31. After forming a conductive film on the second common electrode 23, the conductive pillar 32 can be formed by etching this conductive film so that the conductive pillar 32 may remain, for example. As shown in FIG. 7, after forming the conductive pillar 32 on the second common electrode 23, the alignment film 24 is formed and the TFT substrate 1 and the color filter substrate 2 are stuck together. Without limiting to this, after forming the conductive pillar 32 on the first common electrode 11, the alignment film 12 may be formed, and the TFT substrate 1 and the color filter substrate 2 may be stuck together.

In the modification 2, by pressurization which is applied to at the time when the TFT substrate 1 and the color filter substrate 2 are stuck, the conductive pillar 32 breaks through the alignment film 12, and contacts with the first common electrode 11. Therefore, conduction between the second common electrode 23 and the first common electrode 11 is fully obtained. Of course in the first exemplary embodiment, the conductive pillar 32 can be used instead of the conductive spacer 31.

Modification 3 of the First Exemplary Embodiment

Figure 8:
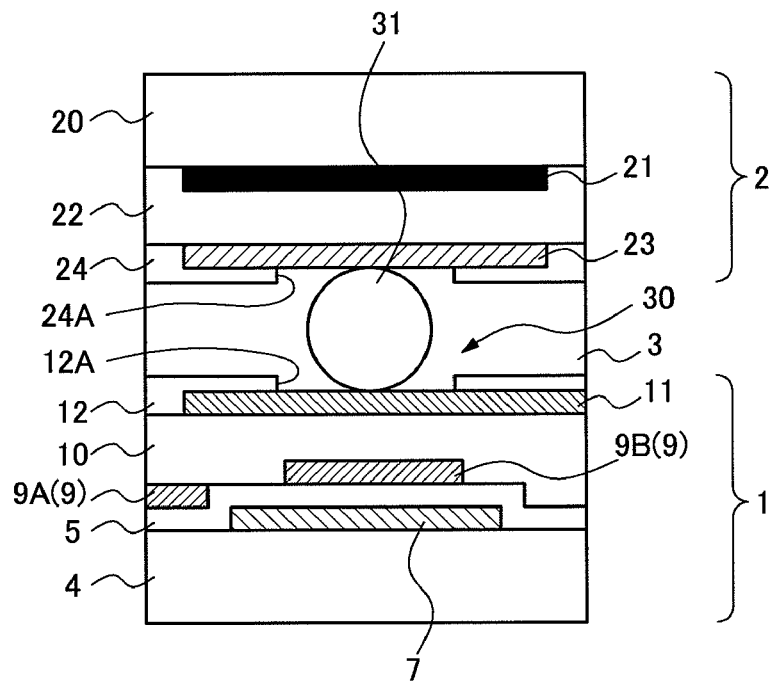
FIG. 8 is a cross-sectional view showing a structure of a conduction part in a case of a modification 3 of the first exemplary embodiment.
Figure 9:
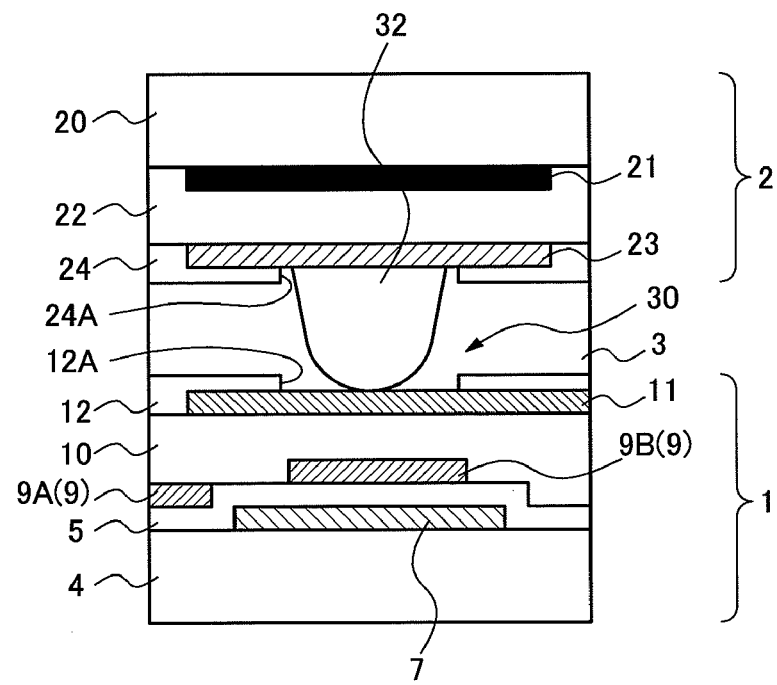
FIG. 9 is a cross-sectional view showing a structure of a conduction part in the case of a modification 3 of the first exemplary embodiment.

FIG. 8 and FIG. 9 are cross sectional views (cross sectional views of a part corresponding to the line IV-IV in FIG. 1) showing a structure of the conducting part 30 in a modification 3 of the first exemplary embodiment.

In the modification 3, openings 12A and 24A are formed in advance in a part of the alignment films 12 and 24, respectively where the conductive spacer 31 is arranged (refer to FIG. 8), or where the conductive pillar 32 is arranged (refer to FIG. 9). By this configuration, the conductive spacer 31 or the conductivity pillar 32 contacts with the first and the second common electrodes 11 and 23 directly without breaking through the alignment films 12 and 24. The modification 3 is particularly effective in the case that the alignment films 12 and 24 are composed of an inorganic alignment film etc., and they are rigid. It is because in this case it is difficult for the conductive spacer 31 or the conductive pillar 32 to break through the alignment films 12 and 24. Although FIG. 9 shows an example in which the conductive pillar 32 is formed on the second common electrode 23, it may be formed on the first common electrode 11.

Modification 4 of the First Exemplary Embodiment

Figure 10:
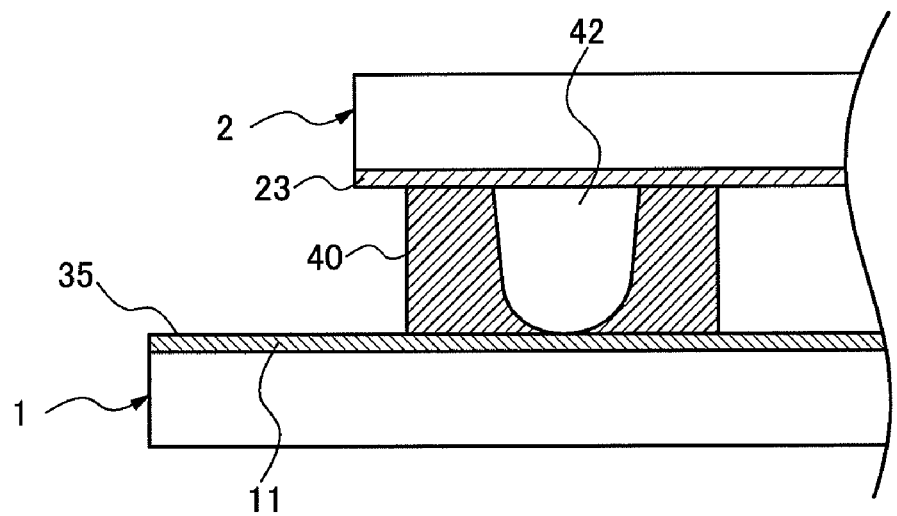
FIG. 10 is a cross-sectional view showing a structure of a peripheral edge part of a TFT substrate and a counter substrate in a case of a modification 4 of the first exemplary embodiment.

FIG. 10 is a cross-sectional view showing a structure of a peripheral edge part of the TFT substrate 1 and the color filter substrate 2 in a modification 4 of the first exemplary embodiment. According to the first exemplary embodiment, as shown in FIG. 5, the first common electrode 11 and the second common electrode 23 electrically connected via the conductive spacer 41 mixed in the sealing agent 40. In this modification 4, the peripheral conduction part is made by using the conductive pillar 42 instead of the conductive spacer 41. That is, in this modification 4, the conductive pillar 42 is formed on the second common electrode 23, and then the TFT substrate 1 and the color filter substrate 2 are stuck together using the sealing agent 40 formed so as to cover the conductive pillar 42. In this configuration, the first common electrode 11 and the second common electrode 23 are electrically connected via the conductive pillar 42. According to the modification 4, it is not required to mix the conductive spacers 41 in the sealing agent 40.

Modification 5 of the First Exemplary Embodiment

Figure 11:
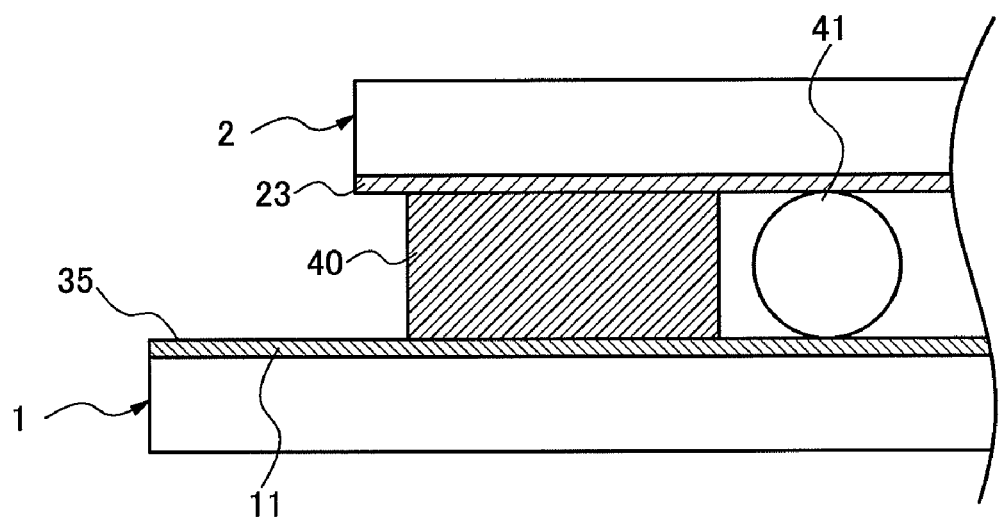
FIG. 11 is a cross-sectional view showing a structure of a peripheral edge part of a TFT substrate and a counter substrate in a case of a modification 5 of the first exemplary embodiment.
Figure 12:
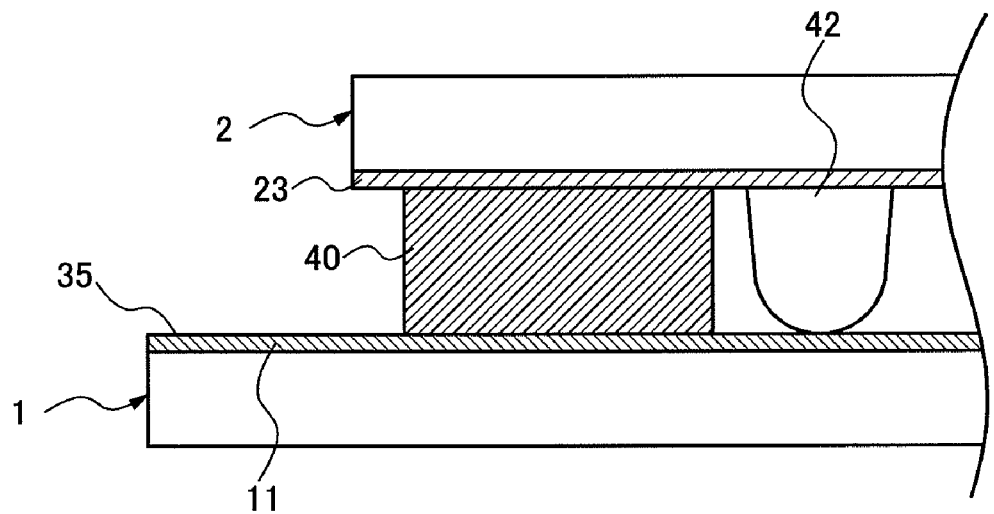
FIG. 12 is a cross-sectional view showing a structure of a peripheral edge part of a TFT substrate and a counter substrate in a case of a modification 5 of the first exemplary embodiment.

FIG. 11 and FIG. 12 are cross-sectional views showing a structure of a peripheral edge part of the TFT substrate 1 and the color filter substrate 2 in a modification 5 of the first exemplary embodiment. In this modification 5, the conductive spacer 41 is arranged in advance in a fixed position which is on the first common electrode 11 or the second common electrode 23 and is near the sealing agent 40 and the inside thereof (FIG. 11). As shown in FIG. 12, the conductive pillar 42 may be formed. After the peripheral conduction part is provided, the TFT substrate 1 and the color filter substrate 2 are stuck together with the sealing agent 40.

Since a laminating condition of a film layer differs between a formation area of the sealing agent 40 and an inside area (an area in which a display action is performed) of this sealing agent 40, there may be a difference in distance between the TFT substrate 1 and the color filter substrate 2. Therefore, the conductive spacer 41 with the same diameter as the conductive spacer 31 used in the area where a display action is performed may be unable to be used in the peripheral edge part. Similarly, the conductive pillar 42 of the same height as the conductive pillar 32 which is used in the area where a display action is performed may be unable to be used in the peripheral edge part.

However, according to the modification 5, the conductive spacer 41 and the conductive pillar 42 is arranged inside of an area in which the sealing agent 40 is arranged. Accordingly, the conductive spacer 41 or the conductive pillar 42 with the same diameter or height as the conductive spacer 31 or the conductive pillar 32 can be used. For this reason, a type of material used for manufacture of the LCD device 100 can be reduced, or the steps of a production process thereof can be reduced.

Modification 6 of the First Exemplary Embodiment

Figure 13:
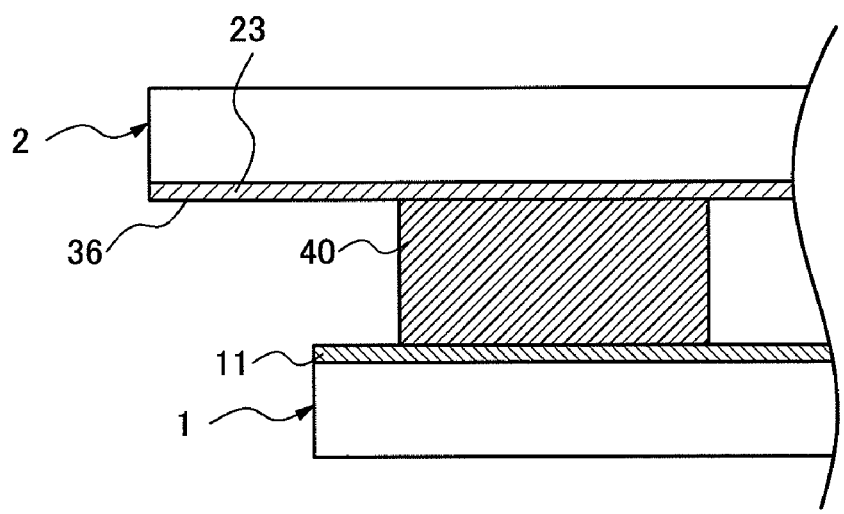
FIG. 13 is a cross-sectional view showing a structure of a peripheral edge part of a TFT substrate and a counter substrate in a case of a modification 6 of the first exemplary embodiment.

FIG. 13 is a cross-sectional view showing a structure of a peripheral edge part of the TFT substrate 1 and the color filter substrate 2 in a modification 6 of the first exemplary embodiment.

In the first exemplary embodiment and modifications 4 and 5, as shown in FIG. 5, the terminal 35 for inputting the common electric potential into the first common electrode 11 is formed in the peripheral edge part of the TFT substrate 1. And the first common electrode 11 and the second common electrode 23 are electrically connected via the conductive spacer 41 or the conductive pillar 42 formed in the peripheral edge part of the TFT substrate 1 and the color filter substrate 2. In contrast, in this modification 6, as shown in FIG. 13, in a peripheral edge part of the color filter substrate 2, a terminal 36 for inputting common electric potential into the second common electrode 23 is formed. Since it is not required to form the peripheral conduction part in the peripheral edge part of the TFT substrate 1 and the color filter substrate 2 according to the modification 6, reduction of the process steps can be performed.

A Second Exemplary Embodiment

Figure 14:
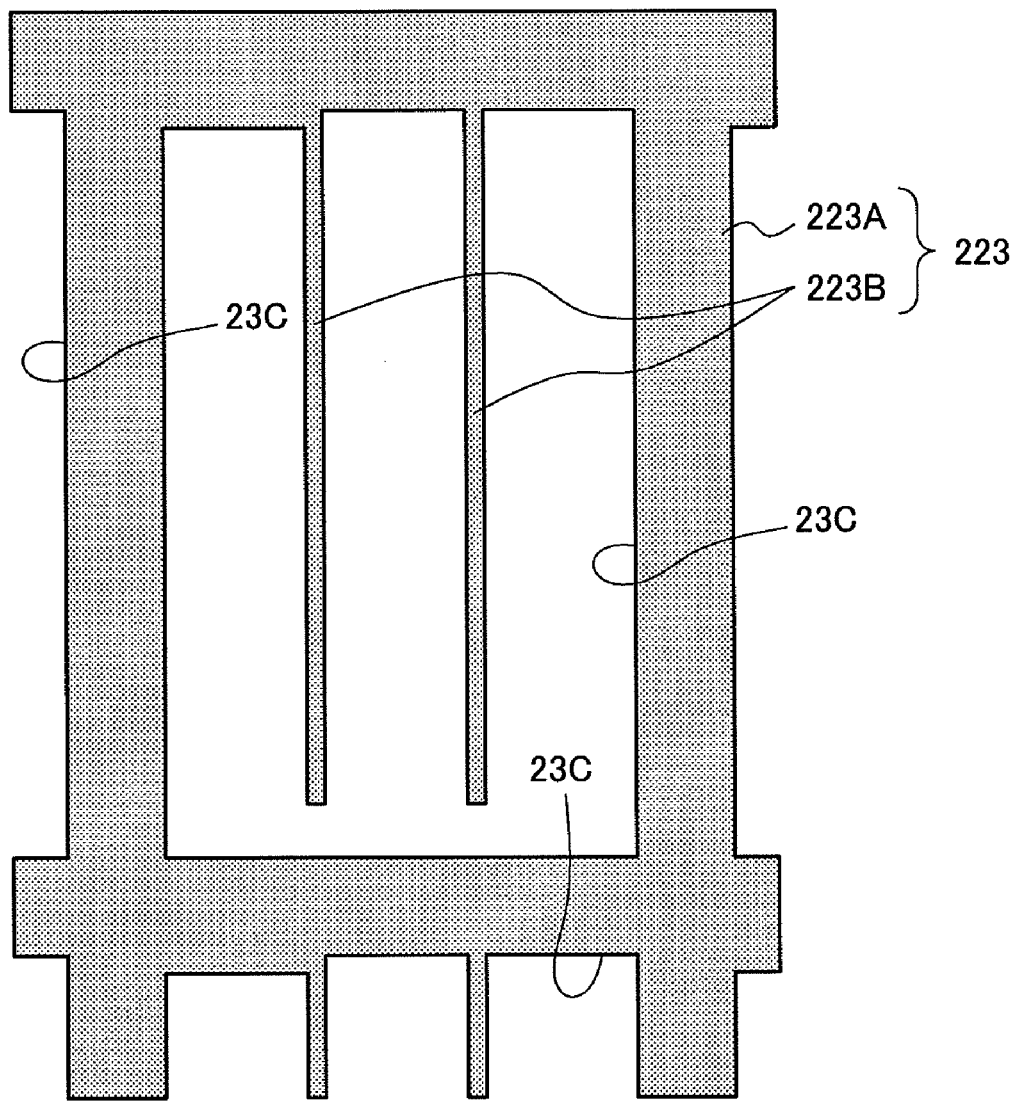
FIG. 14 is a plan view showing a second common electrode provided in a counter substrate of an LCD device according to a second exemplary embodiment.
Figure 15:
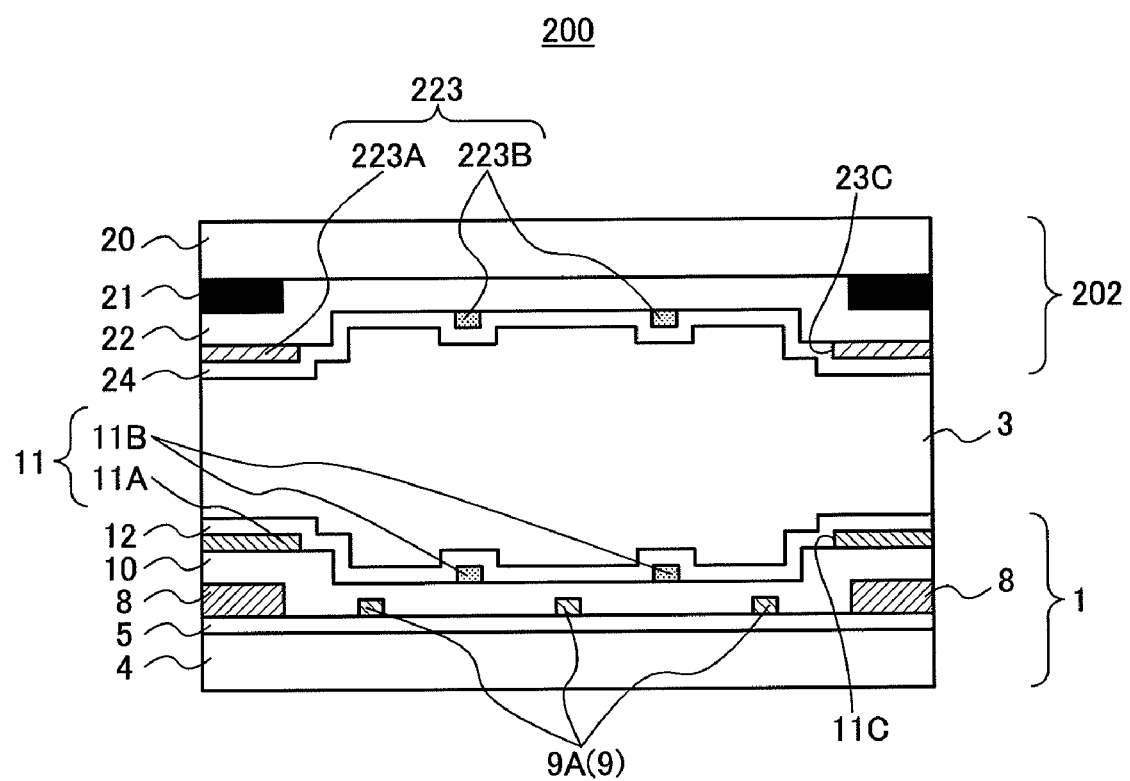
FIG. 15 is a cross-sectional view of the LCD device according to the second exemplary embodiment.

FIG. 14 is a plan view showing a second common electrode 223 provided in a color filter substrate 202 of a LCD device 200 (FIG. 15) according to a second exemplary embodiment, and FIG. 15 is a cross-sectional view of the LCD device 200 according to the second exemplary embodiment.

The TFT substrate 1 provided in the LCD device 200 according to this exemplary embodiment is the same as the TFT substrate 1 (FIG. 1) of the LCD device 100 according to the first exemplary embodiment. Here, FIG. 15 is a cross sectional view of a part corresponding to the line II-II in FIG. 1.

Although the LCD device 200 according to this exemplary embodiment differs only in a shape of a second common electrode 223 from the LCD device 100 according to the first exemplary embodiment, other points thereof are the same as that of the LCD device 100.

As shown in FIG. 14 and FIG. 15, in this exemplary embodiment, the shape of the second common electrode 223 in the color filter substrate 202 is the same shape as the first common electrode 11 in the TFT substrate 1. That is, the second common electrode 223 includes a latticed part 223A and a common electrode comb-tooth (comb-tooth-shaped portion) 223B. The latticed part 223A has an approximately latticed shape which surrounds the display area 13 with covering the black matrix layer 21, and is opposed to the latticed part 11A of the first common electrode 11. The common electrode comb-tooth 223B is a comb-tooth-shaped portion projected over a display area 13 from a part of the latticed part 223A which is opposed to the scanning line 7, and it is opposed to the common electrode comb-tooth 11B of the first common electrode 11.

According to the second exemplary embodiment, the color filter substrate 202 as well as the TFT substrate 1 is provided with the common electrode comb-tooth 223B. By this configuration, a transverse electric field can be strongly applied also near the color filter substrate 202 in this embodiment, while the transverse electric field is strongly applied only near the TFT substrate 1 in the first exemplary embodiment. Therefore, since it becomes easy to rotate a liquid crystal molecule, a voltage applied between the pixel electrode comb-tooth 9A and the common electrode comb-teeth 11B and 223B, that is, a driving voltage, can be reduced.

A Third Exemplary Embodiment

Figure 16:
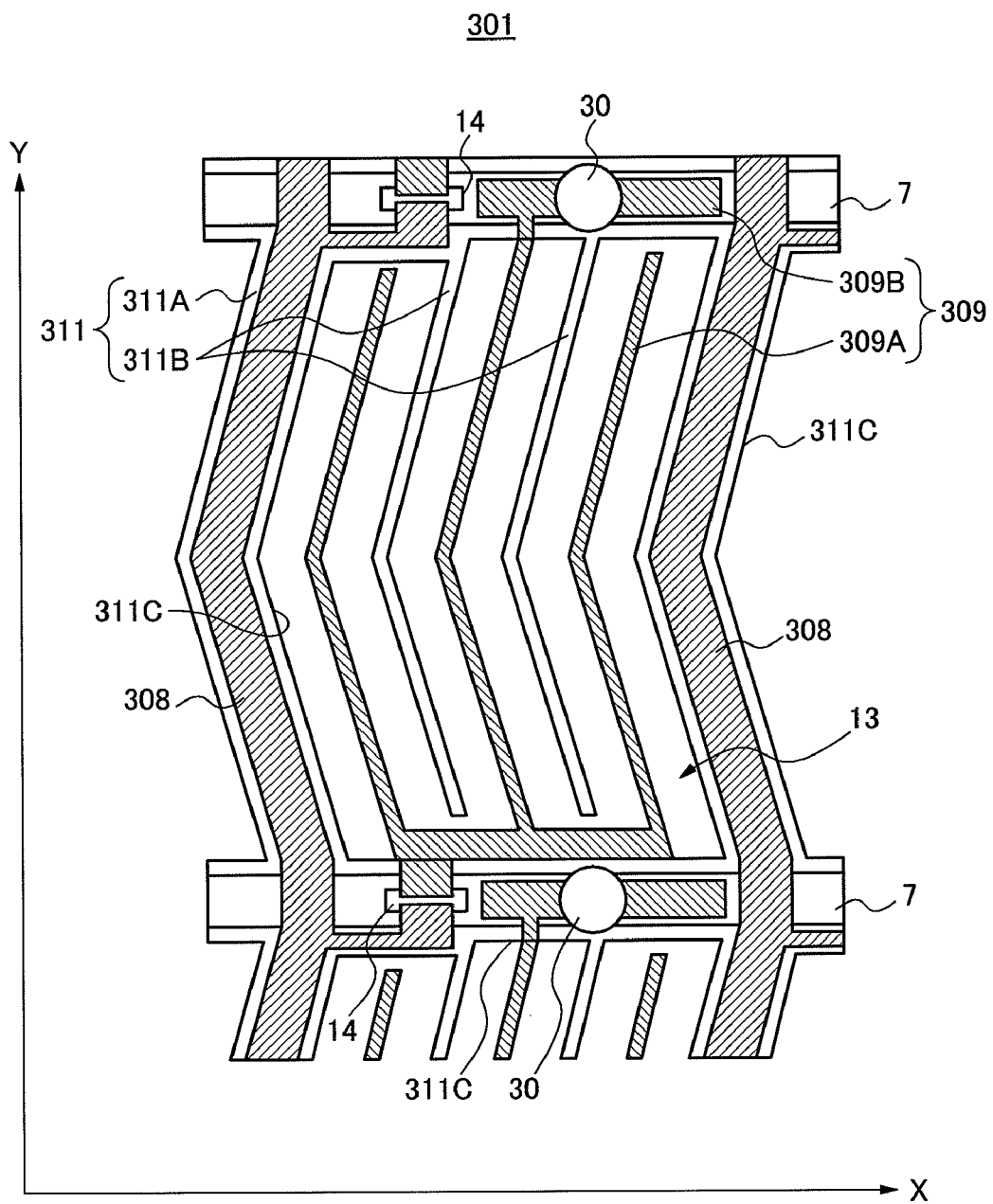
FIG. 16 is a plan view of a TFT substrate provided in an LCD device according to a third exemplary embodiment.
Figure 17:
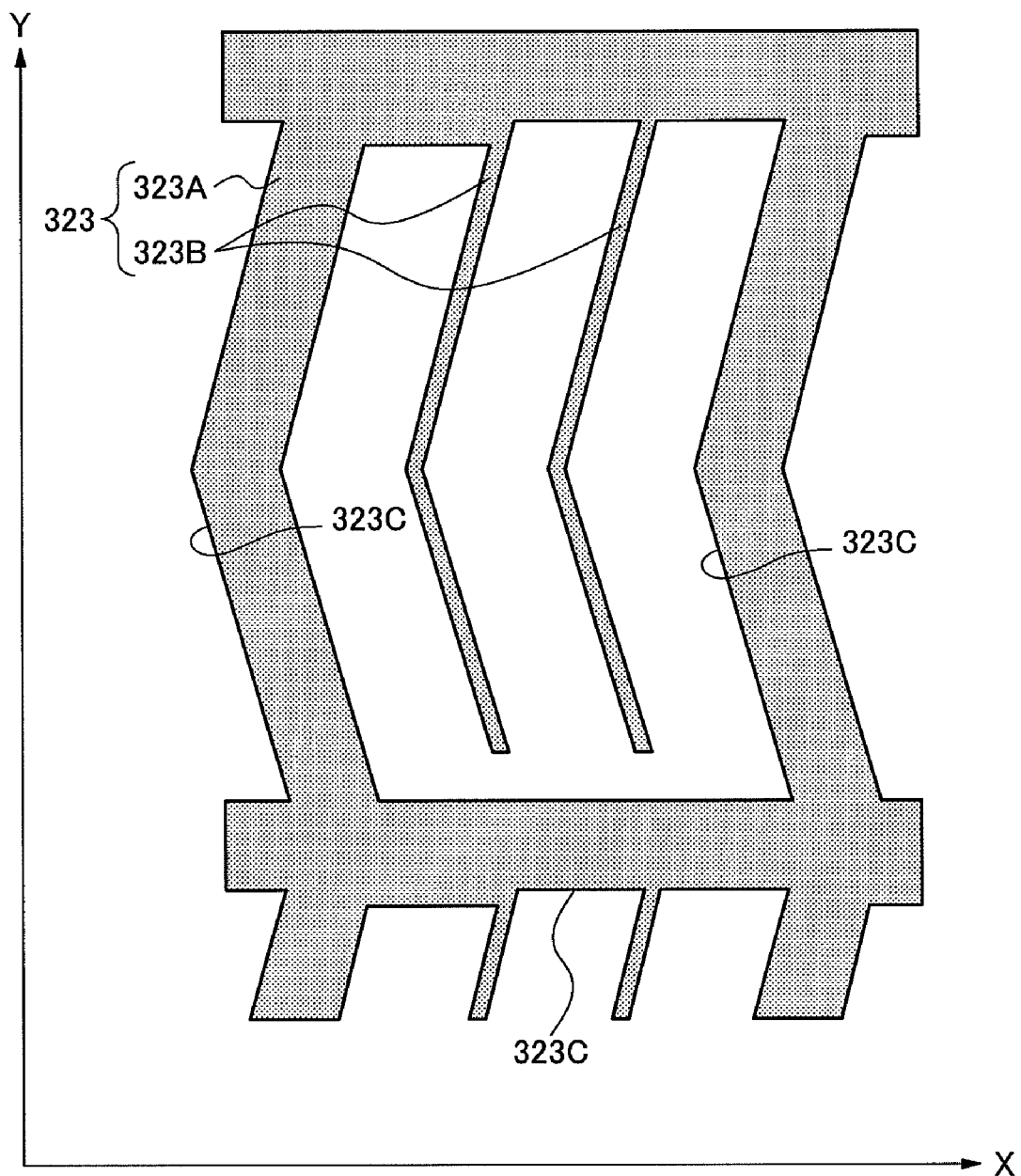
FIG. 17 is a plan view of a second common electrode provided in a color filter substrate according to the third exemplary embodiment.

FIG. 16 is a plan view of a TFT substrate 301 provided in an LCD device according to a third exemplary embodiment, and FIG. 17 is a plan view of a second common electrode 323 provided in a color filter substrate according to the third exemplary embodiment. The alignment film 12 and the second insulating film 10 are not illustrated in FIG. 16.

The LCD device according to the third exemplary embodiment is different from the LCD device 200 according to the second exemplary embodiment only in a point that a data line 308 (FIG. 16), a second common electrode 323 (FIG. 17), a first common electrode 311 (FIG. 16), and a pixel electrode 309 (FIG. 16) are provided, respectively, instead of the data line 8 (FIG. 15), the second common electrode 223 (FIG. 14, FIG. 15), the first common electrode 11 (FIG. 15), and the pixel electrode 9 (FIG. 15) of the LCD device 200 according to the second exemplary embodiment. Other points therein are the same configurations as the LCD device 200 according to the second exemplary embodiment.

In the second exemplary embodiment, as shown in FIGS. 1, 3, and 14, the first common electrode 11, the second common electrode 23, the pixel electrode 9, and the data line 8 extend on the straight in the column direction (Y direction). In contrast, in this exemplary embodiment, as shown in FIG. 16 and FIG. 17, a data line 308, and portions extending in a column direction of a first common electrode 311, a second common electrode 323, and a pixel electrode 309, bend in at least one or more places, that is, they have zigzag shape structures. In the first common electrode 311, an opening 311C with a shape which has at least one or more bending parts in the column direction is formed in a position corresponding to each display area 13.

The first common electrode 311 includes a latticed part 311A and a common electrode comb-tooth 311B like the second exemplary embodiment. And the portion extending in the column direction of the latticed part 311A and the common electrode comb-tooth 311B bend in at least one or more places, respectively. FIG. 16 shows a case where they bend each at one place.

Similarly, an opening 323C with the same shape as an opening 311C is formed in the second common electrode 323 in a matrix form. The second common electrode 323 includes a latticed part 323A and a common electrode comb-tooth 323B like the second exemplary embodiment. And the portion extending in the column direction of the latticed part 323A and the common electrode comb-tooth 323B bend at least at one or more places, respectively. FIG. 17 shows a case where they bend each at one place.

The pixel electrode 309 includes a pixel electrode comb-tooth 309A and a storage capacitance formation part 309B like the second exemplary embodiment. And a portion extending in the column direction of the pixel electrode comb-tooth 309A bends at least at one or more places. FIG. 16 shows a case where it bends each at one place.

Although illustration is omitted in this exemplary embodiment, a black matrix layer of the color filter substrate is bent like the data line 308.

While the same advantageous effect as the second exemplary embodiment is obtained according to the third exemplary embodiment, a new advantageous effect that an optical property in a slanting view improves is obtained, because the first and the second common electrodes 311 and 323 are bent, so a multi-domain in which a rotation direction of liquid crystal molecules differs each other can be formed.

Although FIG. 16 and FIG. 17 show the structures that the data line 308, the first common electrode 311, the second common electrode 323, and the pixel electrode 309 are bent only at one place in the column direction of the display pixel, respectively, it is not limited to these structures, and they may be bent at two or more places, respectively.

Although the second common electrode 323 in the color filter substrate 2 has the common electrode comb-tooth 323B in the third exemplary embodiment, the second common electrode 323 does not need to have the common electrode comb-tooth 323B.

A Fourth Exemplary Embodiment

Figure 18:
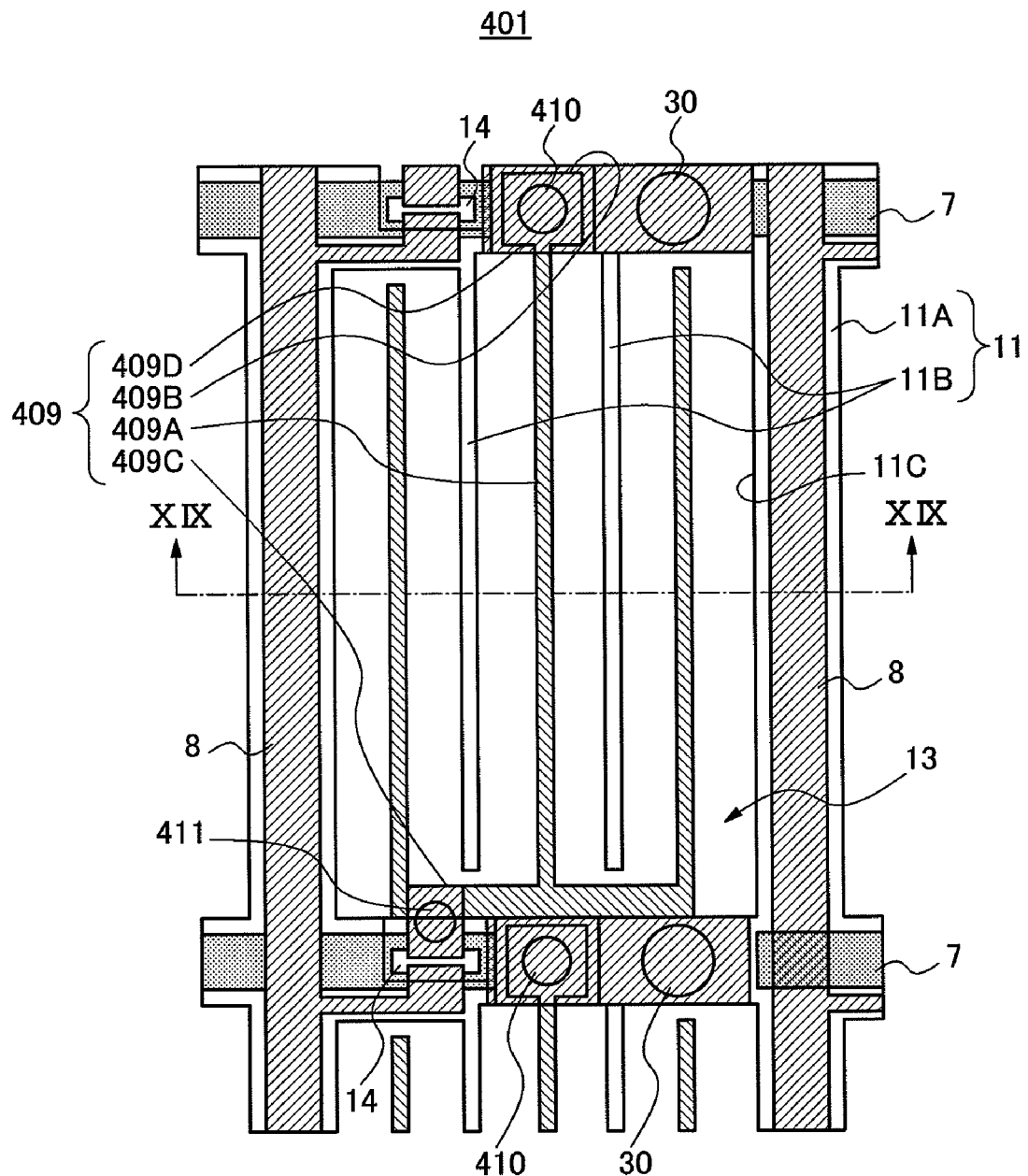
FIG. 18 is a plan view of a TFT substrate provided in an LCD device according to a fourth exemplary embodiment.
Figure 19:
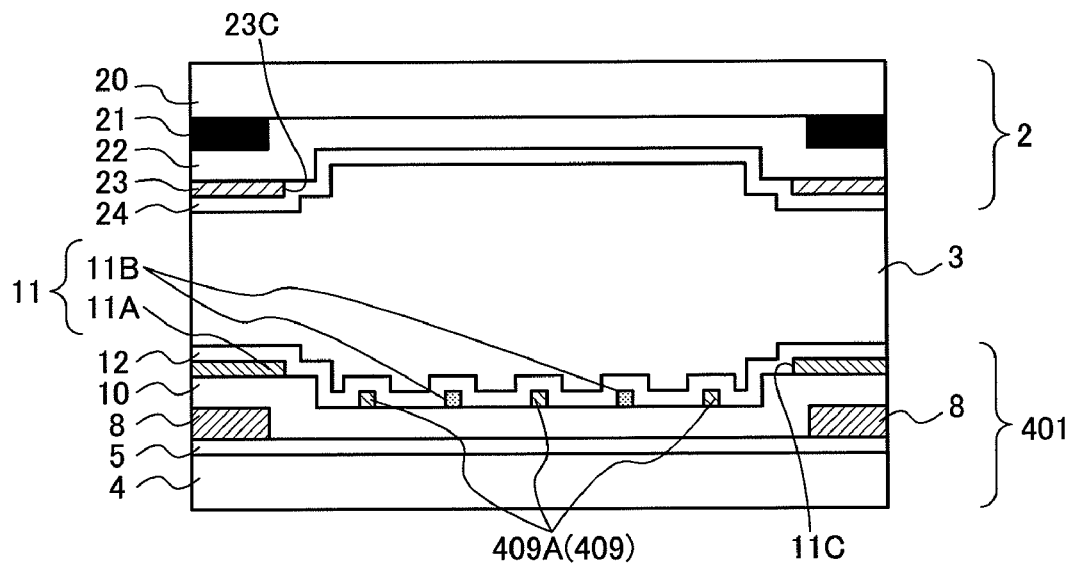
FIG. 19 is a cross-sectional view taken along the line XIX-XIX in FIG. 18.

FIG. 18 is a plan view of a TFT substrate 401 provided in an LCD device 400 (FIG. 19) according to a fourth exemplary embodiment, and FIG. 19 is a cross-sectional view along the line XIX-XIX in FIG. 18. The alignment film 12 and the second insulating film 10 are not illustrated in FIG. 18.

In each above-mentioned exemplary embodiment, all the pixel electrodes 9 or all the pixel electrodes 309 were formed on the same layer. In contrast, pixel electrodes are formed in two layers and the pixel electrodes arranged in the different layers are electrically connected via a contact hole in this exemplary embodiment. That is, the LCD device 400 according to this exemplary embodiment differs from the first exemplary embodiment only in providing a pixel electrode 409A instead of the pixel electrode 9 and contact holes 410 and 411. In other points, the LCD device 400 according to this exemplary embodiment is the same configuration as the LCD device 100 according to the first exemplary embodiment.

As shown in FIG. 18, the pixel electrode 409 of an LCD device 400 according to this exemplary embodiment includes a comb-shaped pixel electrode comb-tooth 409A, a storage capacitance formation part 409B forming a capacitance with the first common electrodes 11, and a conductive part 409C which electrically connects the pixel electrode comb-tooth 409A and the TFT 14 mutually.

The storage capacitance formation part 409B has a similar shape as the pixel electrode comb-tooth 9A in the LCD device 100 according to the first exemplary embodiment and extends in a row direction in the same layer as the data line 8, and it is arranged so as to cover a part of scanning line 7.

The pixel electrode comb-tooth 409A is the same shape as the pixel electrode comb-tooth 9A in the LCD device 100 according to the first exemplary embodiment, and it is formed in the same layer as the common electrode comb-tooth 11B of the first common electrode 11 as shown in FIG. 19. The pixel electrode comb-tooth 409A is provided with an overhanging part 409D projecting upward over the storage capacitance formation part 409B. And in this overhanging part 409D, the pixel electrode comb-tooth 409A is electrically connected to the storage capacitance formation part 409B via the contact hole 410.

And the conductive part 409C is located near the TFT 14, and the pixel electrode comb-tooth 409A and the TFT 14 are electrically connected via a contact hole 411.

According to the fourth exemplary embodiment, the pixel electrode comb-tooth 409A and the common electrode 11 (including the latticed part 11A and the common electrode comb-tooth 11B) can be formed at the same time. Therefore, even when a transparent ITO film is used as the pixel electrode 409, it is not required to add another film formation process and a manufacturing cost of the LCD device can be reduced.

A Fifth Exemplary Embodiment

Figure 20:
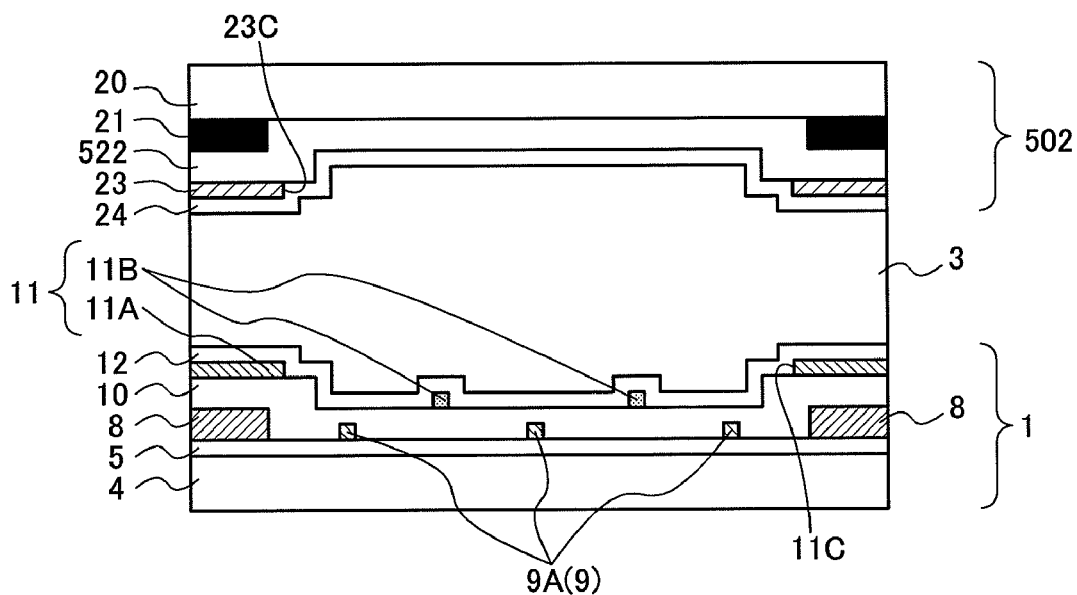
FIG. 20 is a cross-sectional view of an LCD device according to a fifth exemplary embodiment.

FIG. 20 is a cross-sectional view of an LCD device 500 according to a fifth exemplary embodiment, and shows the cross-sectional view of a part corresponding to the line II-II in FIG. 1.

A TFT substrate 1 provided in the LCD device 500 according to this exemplary embodiment is the same as the TFT substrate 1 of the LCD device 100 according to the first exemplary embodiment shown in FIG. 1. As shown in FIG. 20, the LCD device 500 includes a TFT substrate 1, a counter substrate 502 which opposes with the TFT substrate 1 and is stuck with the TFT substrate 1, and a liquid crystal layer 3 interposed between the TFT substrate 1 and the counter substrate 502.

Here, the counter substrate 502 is not provided with a color layer 22, but is provided with an overcoat 522 instead. That is, the LCD device 500 according to this exemplary embodiment is a monochrome monitor which does not perform color display. The LCD device 500 according to this exemplary embodiment is different from the LCD device 100 according to the first exemplary embodiment only in this point, and has the same configuration as the LCD device 100 in other points.

The LCD device 500 in the fifth exemplary embodiment has an advantageous effect of large improvement in luminance by a high aperture ratio, because it is a monochrome monitor which is not provided with the color layer 22.

Modification of the Fifth Exemplary Embodiment

Figure 21:
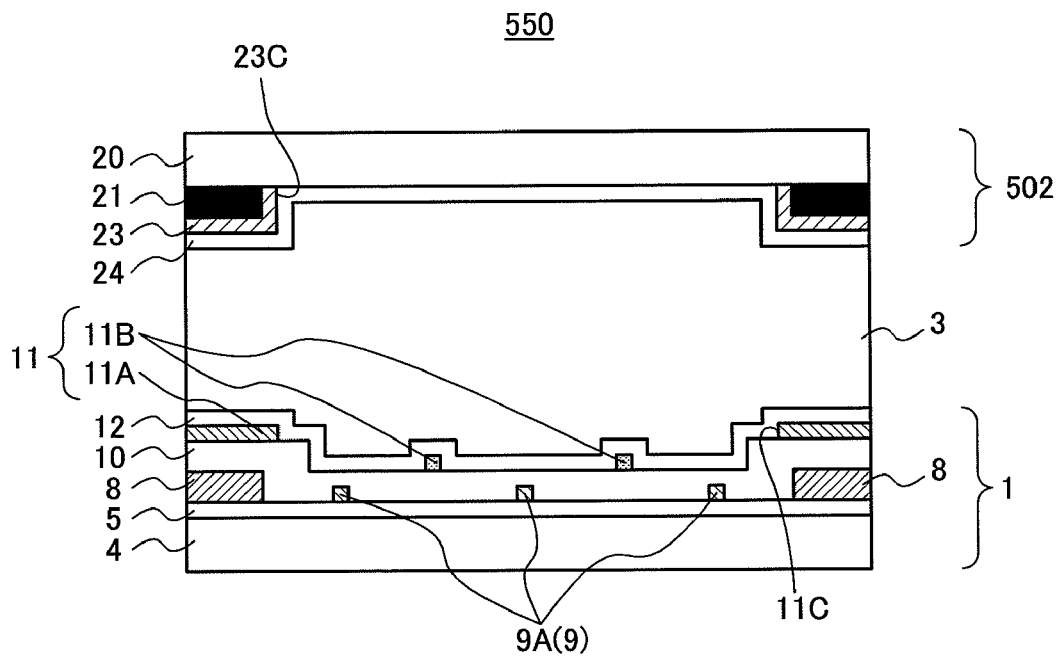
FIG. 21 is a cross-sectional view of an LCD device according to a modification of fifth exemplary embodiment.

FIG. 21 is a cross sectional view of an LCD device 550 according to a modification of the fifth exemplary embodiment. The LCD device 550 is different from the LCD device 500 according to the fifth exemplary embodiment in a point that the counter substrate 502 is not provided with the overcoat 522 and the second common electrode 23 is formed so as to cover entire surface of a black matrix layer 21.

Also in the LCD device 550 according to this modification, the same advantageous effect as the fifth exemplary embodiment is obtained.

A Sixth Exemplary Embodiment

Figure 22:
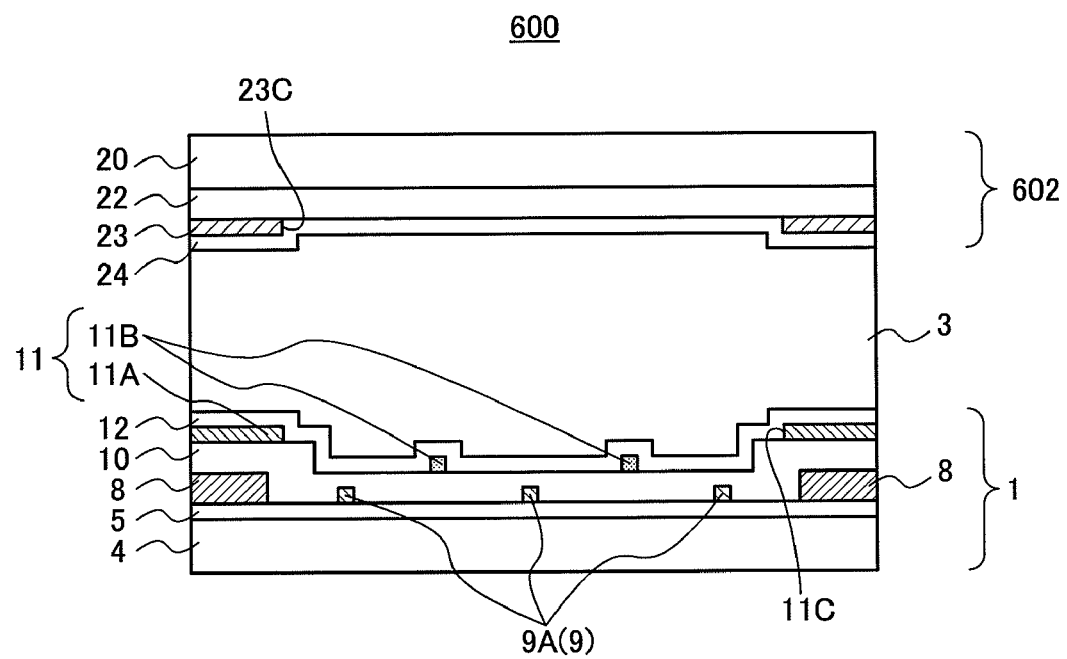
FIG. 22 is a cross-sectional view of an LCD device according to sixth exemplary embodiment.

FIG. 22 is a cross sectional view of an LCD device 600 according to a sixth exemplary embodiment and shows the cross sectional view of a part corresponding to the line II-II in FIG. 1. A TFT substrate 1 provided in the LCD device 600 according to this exemplary embodiment is the same as the TFT substrate 1 of the LCD device 100 according to the first exemplary embodiment shown in FIG. 1.

As shown in FIG. 22, the LCD device 600 according to this exemplary embodiment includes a TFT substrate 1, a color filter 602 which opposes with the TFT substrate 1 and is stuck therewith, and a liquid crystal layer 3 interposed between the TFT substrate 1 and the color filter substrate 602.

The color filter substrate 602 in this exemplary embodiment is different from the color filter substrate 2 of the LCD device 100 according to the first exemplary embodiment only in a point that the black matrix layer 21 is not provided therein. Because both the scanning line 7 and the data line 8 are shielded with the first common electrode 11 according to this exemplary embodiment, light leakage caused by electric field leakage does not generate. Therefore, it is possible to delete the black matrix layer 21 in the color filter substrate 602.

The black matrix layer is designed that its width is wider than that of the scanning line 7 and the data line 8 in order to prevent overlapping gap between the TFT substrate 1 and the color filter substrate 2 from causing light leakage. Therefore, there is a problem that an aperture ratio of the display area 13 decreases in the LCD device formed a black matrix layer.

However, since the black matrix layer is not formed in this exemplary embodiment, it does not need to secure a margin of the width of the black matrix layer in consideration of the above-mentioned overlapping gap. Therefore the aperture ratio of the display area 13 can be increased The technical features described in each above-mentioned exemplary embodiment can be arbitrarily combined. That is, for example, in the fourth to sixth exemplary embodiments, as well as in the second exemplary embodiment, the second common electrode in the color filter substrate may have a comb-tooth-shaped portion.

In the fourth to sixth exemplary embodiment, as well as in the third exemplary embodiment, the portion extending in the column direction (Y direction) in the first common electrode, the second common electrode, and the pixel electrode, and the data line may have a structure of bending at least at one or more places, respectively.

In each of above second, third, fifth, and sixth exemplary embodiment, as well as in the fourth exemplary embodiment, the pixel electrode may be composed of several different layers, and these different layers may be mutually connected via a contact hole. In addition, the comb-tooth-shaped portion of the pixel electrode may be formed in the same layer as the first common electrode.

In the second to sixth above-mentioned exemplary embodiment, as well as in the fifth exemplary embodiment, an LCD device for monochrome displays which is not provided with a color layer may be available.

In the second to fifth exemplary embodiments, as well as in the sixth exemplary embodiment, the structure which is not provided with a black matrix layer (light-shielding layer) may be adopted.

A seventh exemplary embodiment of the present invention is that a light-shielding layer with a light-shielding function is formed in the counter substrate, and the second common electrode is formed covering the light-shielding layer.

Furthermore, an eighth exemplary embodiment of the present invention is that a light-shielding layer with a light-shielding function is not formed on the counter substrate.

A ninth exemplary embodiment of the present invention is that the conduction part is composed of a conductive spacer or a conductive pillar.

A tenth exemplary embodiment of the present invention is that the pixel electrode, the first common electrode, and the second common electrode are formed in parallel mutually, and are formed in a zigzag shape, respectively.

An eleventh exemplary embodiment of the present invention is that the pixel electrode and the first common electrode are provided with a comb-tooth-shaped portion projected into a display area of each display pixel, respectively so that an electric field along a principal plane of the TFT substrate can be applied to the liquid crystal thereby.

A twelfth exemplary embodiment of the present invention is that the second common electrode is provided with a comb-tooth-shaped portion projected into a display area of each display pixel so that an electric field along a principal plane of the counter substrate can be applied to the liquid crystal thereby.

A thirteenth exemplary embodiment of the present invention is that the comb-tooth-shaped portion of the pixel electrode and the first common electrode are formed in a same layer with the same material.

A fourteenth exemplary embodiment of the present invention is that the pixel electrode includes a storage capacitance formation part for forming a capacitance with the first common electrode, and a conductive part for electrically connecting the comb-tooth-shaped portion of the pixel electrode and the thin film transistor mutually, the comb-tooth-shaped portion of the pixel electrode is formed in a different layer from the storage capacitance formation part of the pixel electrode and the conductive part, and the comb-tooth-shaped portion of the pixel electrode, the storage capacitance formation part of the pixel electrode, and a conductive part of the pixel electrode are electrically connected mutually via a contact hole, respectively.

A fifteenth exemplary embodiment of the present invention is that a color layer is not formed in the counter substrate and the LCD device performs a monochrome display.

A sixteenth exemplary embodiment of the present invention is that the first common electrode and the second common electrode are electrically connected mutually via a periphery conduction part formed in a peripheral edge part of the TFT substrate and the counter substrate, a terminal for inputting common electric potential into the first common electrode is formed in the peripheral edge part of the TFT substrate, and the common electric potential inputted into the first common electrode from the terminal is inputted into the second common electrode via the periphery conduction part.

A seventeenth exemplary embodiment of the present invention is that the first common electrode and the second common electrode are electrically connected mutually via a periphery conduction part formed in a peripheral edge part of the TFT substrate and the counter substrate, and a terminal for inputting a common electric potential into the second common electrode is formed in a peripheral edge part of the counter substrate.

An eighteenth exemplary embodiment of the present invention is that a driving method of an LCD device having a first common electrode, a second common electrode, and a conduction part, including, inputting a common potential to the second common electrode and inputting the common potential to the first common electrode via the conducting part, wherein the LCD device including, a TFT substrate having a substrate and a display pixel arranged in a matrix form on the substrate, with the display pixel including a plurality of scanning lines, a plurality of signal lines, a plurality of pixel electrodes, a plurality of thin film transistors and the first common electrode, a counter substrate opposed to the TFT substrate and being stuck therewith, and a liquid crystal enclosed between the TFT substrate and the counter substrate, wherein the pixel electrode and the first common electrode are arranged so that an electric field along a principal plane of the TFT substrate can be applied to the liquid crystal, the second common electrode is formed in the counter substrate, the second common electrode is opposed to the first common electrode, and the conduction part for electrically connecting the second common electrode and the first common electrode mutually is formed near each display pixel or near a predetermined display pixel.

The related IPS mode LCD device described in the background art causes a problem that an aperture ratio thereof is low. This is because it is necessary to form not only a comb-tooth electrode but a common electrode wiring in a display area. Although an aperture ratio can be made high by a certain amount of value by means of forming a comb-tooth electrode with an ITO electrode, or making a single common electrode wiring per every display pixel, it has not reached to a value of an aperture ratio of a vertical electric field mode LCD device.

The related IPS mode LCD device causes a problem such as a spot, a stain, and an afterimage, etc. This is due to the following reason. Because conductive materials, such as a color layer and a black matrix layer, are formed on the surface of the color filter substrate, charge is accumulated by an electric field from the TFT substrate, or movement of ion therein. By this charge, an electric field in the vertical direction is generated and it disturbs an electric field applied in parallel to the TFT substrate and the color filter substrate.

An exemplary advantage according to the invention is that an aperture ratio of display area in each display pixel increases. This is due to the following reason. An input of common electric potential to the first common electrode provided in the TFT substrate can be applied via the conduction part through the second common electrode provided in the counter substrate. Therefore, it is not required to have a common electrode wiring formed in the related TFT substrate. As a result, the aperture area in each display pixel can increase by the space where the common electrode wiring is arranged in the related TFT substrate.

A spot, a stain and an afterimage, etc. can be suppressed because the color layer and the light-shielding layer (black matrix layer etc.) in the counter substrate can be shielded from an electric field generated in the TFT substrate by the second common electrode provided in the counter substrate.

If the comb-tooth-shaped portion is formed also in the second common electrode, the driving voltage can be reduced because the electric field with enough intensity can be applied to the liquid crystal near the counter substrate.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

What is claimed is:
1. A liquid crystal display device, comprising:
a thin film transistor (TFT) substrate including a substrate and a display pixel arranged in a matrix form on said substrate, with said display pixel including a plurality of scanning lines, a plurality of signal lines, a plurality of pixel electrodes, a plurality of thin film transistors and a first common electrode;
a counter substrate opposed to said TFT substrate and being stuck therewith; and
a liquid crystal enclosed between said TFT substrate and said counter substrate,
wherein one of said pixel electrodes and said first common electrode are arranged so that an electric field along a principal plane of said TFT substrate can be applied to said liquid crystal, a second common electrode for inputting a common electric potential is formed on said counter substrate, said second common electrode is opposed to said first common electrode, and a conduction part for electrically connecting said second common electrode and said first common electrode mutually and transmitting said common electric potential to said first common electrode is formed near each display pixel or near a predetermined display pixel,
wherein said pixel electrode and said first common electrode are provided with a comb-tooth-shaped portion projected into a display area of each display pixel, respectively so that an electric field along a principal plane of said TFT substrate can be applied to said liquid crystal thereby,
wherein said comb-tooth-shaped portion of said pixel electrode and said first common electrode are formed in a same layer,
wherein said pixel electrode includes a storage capacitance formation part for forming a capacitance with said first common electrode, and a conductive part for electrically connecting said comb-tooth-shaped portion of said pixel electrode and said thin film transistor mutually,
said comb-tooth-shaped portion of said pixel electrode is formed in a different layer from said storage capacitance formation part of said pixel electrode and said conductive part, and
said comb-tooth-shaped portion of said pixel electrode, said storage capacitance formation part of said pixel electrode, and a conductive part of said pixel electrode are electrically connected mutually via a contact hole, respectively.

2. The liquid crystal display device according to claim 1, wherein a light-shielding layer with a light-shielding function is formed on said counter substrate, and said second common electrode is formed covering said light-shielding layer.

3. The liquid crystal display device according to claim 1, wherein a light-shielding layer with a light-shielding function is not formed on said counter substrate.

4. The liquid crystal display device according to claim 1, wherein said conduction part is composed of a conductive spacer or a conductive pillar.

5. The liquid crystal display device according to claim 1, wherein said pixel electrode, said first common electrode, and said second common electrode are formed in parallel mutually, and are formed in a zigzag shape, respectively.

6. The liquid crystal display device according to claim 1, wherein said second common electrode is provided with a comb-tooth-shaped portion projected into a display area of each display pixel so that an electric field along a principal plane of said counter substrate can be applied to said liquid crystal thereby.

7. The liquid crystal display device according to claim 1, wherein a color layer is not formed in said counter substrate and said liquid crystal display device performs a monochrome display.

8. The liquid crystal display device according to claim 1, wherein said first common electrode and said second common electrode are electrically connected mutually via a periphery conduction part formed in a peripheral edge part of said TFT substrate and said counter substrate,
  a terminal for inputting common electric potential into said first common electrode is formed in said peripheral edge part of said TFT substrate, and
  said common electric potential inputted into said first common electrode from said terminal is inputted into said second common electrode via said periphery conduction part.

9. The liquid crystal display device according to claim 1, wherein said first common electrode and said second common electrode are electrically connected mutually via a periphery conduction part formed in a peripheral edge part of said TFT substrate and said counter substrate, and a terminal for inputting a common electric potential into said second common electrode is formed in a peripheral edge part of said counter substrate.

* * * * *